United States Patent [19]
Kojima

[11] Patent Number: 5,590,222
[45] Date of Patent: Dec. 31, 1996

[54] IMAGE SIGNAL PROCESSING APPARATUS UTILIZING A 2D HAAR TRANSFORM AND ADAPTIVE SELECTION OF IMAGES BASED ON A PARAMETER SUCH AS A RATIO OF COEFFICIENTS FOR REDUCING BLOCK DISTORTION AND METHOD THEREOF

[75] Inventor: Yuichi Kojima, Kanagawa, Japan

[73] Assignee: Sony Corporation, Tokyo, Japan

[21] Appl. No.: 339,002

[22] Filed: Nov. 14, 1994

[30] Foreign Application Priority Data

Nov. 15, 1993 [JP] Japan .................................. 5-308730

[51] Int. Cl.$^6$ .................................................... G06K 9/40
[52] U.S. Cl. ............................ 382/268; 382/254; 382/276
[58] Field of Search ..................................... 382/248, 250, 382/276, 268, 239, 252; 358/430, 432, 433, 447, 448; 348/465, 466

[56] References Cited

U.S. PATENT DOCUMENTS

| | | | |
|---|---|---|---|
| 4,261,043 | 4/1981 | Robinson et al. | 358/432 |
| 5,293,415 | 3/1994 | Hartley et al. | 378/108 |
| 5,384,849 | 1/1995 | Jeong | 382/248 |
| 5,454,051 | 9/1995 | Smith | 382/268 |

OTHER PUBLICATIONS

Transactions of the Institute of Electronics, Information and Communication Engineers A, Feb. 1988, Japan, vol. J71A, No. 2, ISSN 0373-6091, pp. 481-487, Wu Z et al. 'Modified block transform coding of images'.

Visual Communications and Image Processing, Cambridge, MA, USA, 15-16 Sep. 1986, vol. 707, ISSN 0277-786X, Proceedings of the SPIE-the International Society for Optical Engineering, 1986, USA, pp. 182-187, TRAN A 'Block--effect reduction in transform coding'.

Journal of Electronic Imaging, Apr. 1992, USA, vol. 1, No. 2, ISSN 1017-9909, pp. 183-191, Avril C et al. 'Linear filtering for reducing blocking effects in orthogonal transform image coding'.

European Transactions on Telecommunications and Related Technologies, May–Jun. 1992, Italy, vol. 3, No. 3, pp. 265–274, Albanesi M G et al. 'Image compression by the wavelet decomposition'.

Patent Abstracts of Japan vol. 017 No. 508 (E-1431), 13 Sep. 1993, JP-A-05 130424 (Sony Corp) 25 May 1993, abstract.

*Primary Examiner*—Leo Boudreau
*Assistant Examiner*—Timothy M. Johnson
*Attorney, Agent, or Firm*—William S. Frommer; Alvin Sinderbrand

[57] ABSTRACT

A technique for processing a decoded image signal having a distortion obtained by decoding coded data by utilizing a two-dimensional inverse orthogonal transformation in which the coded data is obtained by coding an image signal by utilizing a two-dimensional orthogonal transformation. At least one correction block is constructed each including a plurality of pixels from a plurality of coded blocks from the decoded image signal and having a distortion on at least one boundary therebetween. The coded blocks of each correction block are adjacent to one another. A two-dimensional orthogonal transformation of each the correction block is performed by utilizing a Haar function so as to form a plurality of coefficients including higher-order side coefficients, lower-order side coefficients and a dc coefficient. A correction value is added to the higher-order side coefficients in accordance with a predetermined number of the lower-order side coefficients when the predetermined number of the lower-order side coefficients have values other than zero so as to form a correction coefficient signal for each correction block. A two-dimensional inverse orthogonal transformation is performed on the correction coefficient signal of each correction block by utilizing the Haar function so as to obtain a smoothed image signal in which each distortion on each boundary of the coded blocks has been smoothed.

8 Claims, 21 Drawing Sheets

DC CHANNEL

3 LOWER-ORDER CHANNELS

A REGION

B REGION

C REGION

D REGION

IMAGE SIGNAL PROCESSING APPARATUS UTILIZING A 2D HAAR TRANSFORM AND ADAPTIVE SELECTION OF IMAGES BASED ON A PARAMETER SUCH AS A RATIO OF COEFFICIENTS FOR REDUCING BLOCK DISTORTION AND METHOD THEREOF

BACKGROUND OF THE INVENTION

1. Field of the Invention

The present invention relates to an image signal processing technique and, more particularly, to such technique for processing a decoded image signal obtained by decoding coded data by utilizing a two-dimensional inverse orthogonal transformation in which the coded data is obtained by coding an image signal by utilizing a two-dimensional orthogonal transformation which may, for example, be applicable in image transmission to a remote location using a transmitting medium having a limited transmission capacity or in digital recording and reproducing of an image on a video tape recorder or video disk recorder having a limited capacity.

2. Description of the Prior Art

In systems transmitting an image signal to a remote location, such as a video conference system, the amount of information transmitted may be reduced by efficiently coding significant information by utilizing the correlation between image signals. As a result, the transmission efficiency is enhanced. Similarly, in an apparatus for digitizing an image signal and for recording and reproducing such digitized signal on a video tape recorder or video disk recorder or the like, the amount of record information may be reduced by efficiently coding significant information by utilizing the correlation between digitized image signals, thereby enhancing the recording efficiency. Accordingly, in these situations, the transmission path and the recording medium are effectively utilized.

The above-mentioned coding may be performed by utilizing a block orthogonal transformation coding method, such as a discrete cosine transform (DCT). FIGS. 16 and 17 respectively illustrate an image coding apparatus 149 and an image decoding apparatus 159 which utilize a block orthogonal transformation coding method such as DCT and an inverse thereof. Each such apparatus will now be described.

In the image coding apparatus 149 of FIG. 16, an input image signal S140, which may be a scanning signal, is supplied to a blocking circuit 140. The blocking circuit 140 transforms the received signal into a blocked image signal S141 representing blocks of 8×8 pixels. An 8×8 block is utilized herein as a transformation unit. The blocked image signal S141 is supplied to an orthogonal transformation circuit 141 which transforms the received blocked image signal into a plurality of coefficients S142 for each coded block. Each such coefficient S142 is supplied to a quantization circuit 142 so as to be quantized with accuracy corresponding to the location of each coefficient within the coded block and supplied therefrom as a quantized coefficient S143.

It is to be noted that when the visual capabilities and the like of a human being are considered, a lower-order side coefficient including many components of a low region which is of significant importance in constructing an image is quantized with a relatively high degree of accuracy, whereas a higher-order side coefficient including many components of a high region which is of lesser importance in constructing an image is quantized with a relatively low degree of accuracy.

Each quantized coefficient S143 is supplied to a variable-length coding circuit 143, in which a code having a relatively short length is assigned to the quantized coefficient having a relatively high frequency of occurrence and a code having a relatively long length is assigned to the quantized coefficient having a relatively low frequency of occurrence. As a result, the variable-length coding circuit 143 produces coded data S144 wherein the sum or total of the code lengths, which is the information to be transmitted or recorded, is reduced.

The coded data S144 is supplied to a buffer memory 144 so as to smooth the information amount. An output signal S145 is supplied from the buffer memory 144 as an output of the image coding apparatus 149. The buffer memory 144 further supplies therefrom a quantized accuracy information signal S146, which represents the amount of storage of the buffer memory 144, as another output of the image coding apparatus 149. The quantized accuracy information signal S146 is also constantly fed back to the quantization circuit 142 and utilized therein for controlling the accuracy of the quantization, so that the speed of the output signal S145 may become constant.

The image decoding apparatus 159 of FIG. 17 generally performs inverse operations to those performed by the image coding apparatus 149 of FIG. 16 and, accordingly, only a cursory description thereof will be provided herein.

In the image decoding apparatus 159, coded data S150 and quantization accuracy information S156 are received from a transmitting medium or the like. The received coded data S150 is supplied through a buffer memory 150 to a variable-length decoding circuit 151 which, in turn, supplies quantized coefficients S151 therefrom. Each quantized coefficient S151 along with the received quantization accuracy information S156 are supplied to an inverse quantization circuit 152, wherein the quantized coefficients are inverse-quantized based on the quantization accuracy information and inverse-quantized coefficients S152 are produced. Each inverse-quantized coefficient S152 is supplied to an inverse orthogonal transformation circuit 153, which restores or transforms the received inverse-quantized coefficient to a blocked image signal S153 for each coded block. The blocked image signal S153 is supplied to a scanning signal circuit 154, whereupon the same is formed as a scanning signal and supplied therefrom as an output image signal S154 of the image decoding apparatus.

The above-described coding technique enables an image to be relatively easily restored with a high picture quality and with a high compression efficiency. Accordingly, such coding technique utilizing a block orthogonal transformation, such as DCT, is widely used. However, if the amount of coded data is reduced so as to enhance the compression efficiency, the quantization accuracy may not be sufficiently defined. As a result, a problem or drawback may arise wherein a relatively easily observable block-shaped distortion occurs. That is, in this situation, a block-shaped distortion occurs due to the insufficient accuracy of the quantization of the transformation coefficient(s).

To remove or minimize the above-described block distortion, the quantization accuracy may be enhanced. However, if the quantization accuracy is enhanced, then the compression efficiency will be reduced. As a result, the effective utilization of the respective medium, which has a limited data capacity, cannot be effected. As is to be appreciated, such effective utilization of the respective medium is a primary or fundamental objective. In an effort to solve this problem, a postprocessing technique which eliminates block distortion and enhances the picture quality by processing a restored image without reducing the compression efficiency has been developed. Such technique will now be described with reference to FIGS. 18–20.

The above-described technique involves an image signal processing method which may be performed by a block distortion smoothing apparatus 168 illustrated in FIG. 18. In such smoothing apparatus, an output image signal S160 from an image decoding apparatus, which may be the output image signal S154 from the image decoding apparatus 159 of FIG. 17, is received by a blocking circuit 160. Such output image signal S160 includes a block distortion due to DCT processing in a manner as previously described. The blocking circuit 160 is adapted to process the received image signal having a predetermined number of pixels so as to form a blocked image signal S161 having a larger predetermined number of pixels. For example, if the coded block in the blocking circuit 160 has 8×8 pixels, such as a coded block 96 as shown in FIG. 19, the blocked image signal S161 supplied from the blocking circuit 160 represents a so-called processing block and may have 24×24 pixels, such as a processing block 98 shown in FIG. 19. (In FIG. 19, the coded blocks 96 are identified by broken lines, and the processing block 98 is identified by a solid line.)

The blocked image signal S161 is supplied to a two-dimensional DCT circuit 161, which is adapted for processing a signal having 24×24 pixels, whereupon such received signal is transformed into a blocked coefficient signal S162 having 24×24 coefficients. The blocked coefficient signal S162 is supplied to a higher-order coefficient processing circuit 162 which is adapted to set higher-order side coefficients to a value of zero. More specifically, since a distortion observed as a discontinuous line of a block boundary tends to be transformed to a higher-order side coefficient(s), the higher-order side of the transformed coefficient(s) are set to zero as shown in FIG. 20. That is, a shaded portion 97 of FIG. 20 represents the higher-order coefficient(s) of the 24×24 vertical and horizontal coefficients which are set to zero. Alternatively, instead of setting the higher-order side coefficient(s) to zero, the values of such higher-order coefficient(s) may be compressed.

A processed coefficient signal S163 from the higher-order coefficient processing circuit 162 is supplied to a two-dimensional inverse DCT circuit 163 which is adapted to perform an inverse DCT operation on the received signal so as to form a processed blocked image signal S164 having 24×24 pixels wherein the block distortion is eliminated. Such processed blocked image signal S164 is supplied to a scanning signal circuit 164 so as to form an output image signal S165 which is substantially identical in form to the image signal S160. The image signal S165 is supplied from the block distortion smoothing apparatus 168.

In the above-described conventional block distortion smoothing apparatus 168, DCT and/or inverse DCT processing is performed utilizing relatively large blocks of data, as previously described. As a result, the amount of calculations associated therewith becomes extremely large. Further, utilizing such apparatus to process a dynamic image increases such calculations and/or the complexity thereof. As is to be appreciated, such large amount of calculations increases the total processing time. As a result, attaining a desired and proper operation while minimizing the fabrication complexity of the block distortion smoothing apparatus 168 may be difficult. In addition, when a still image is processed with a general digital signal processor (DSP) or the like, the processing time may still be relatively long.

Further, in the above-described conventional block distortion smoothing apparatus 168, the higher-order side coefficient(s) may be compressed as previously described. As a result, the high region component(s) of the original image along with the block distortion are compressed. Such compression may adversely affect the resolution, thereby causing the picture quality to be reduced. These adverse affects in the resolution may be minimized by changing the type of processing between selected portions of a respective image. For example, the type of processing can be changed between a portion of the respective image in which the block distortion is easily observable and a portion of such image in which the block distortion is not easily observable. However, changing the type of processing based on the transformation coefficients may not be easily accomplished by the conventional block distortion smoothing apparatus 168. As a result, adaptable processing wherein effective processing changes are performed may not be accomplished by such block distortion smoothing apparatus 168.

Thus, the prior art has failed to provide an image signal processing technique for eliminating or reducing block distortions in a decoded image signal obtained by decoding coded data by utilizing a two-dimensional inverse orthogonal transformation in which the coded data is obtained by coding an image signal by utilizing a two-dimensional orthogonal transformation wherein the amount of calculations are relatively low, the operation and/or fabrication of the associated image signal processing apparatus is relatively easy, and which does not adversely affect the image resolution.

OBJECTS AND SUMMARY OF THE INVENTION

An object of the present invention is to provide a technique for image signal processing which overcomes the problems associated with the prior art.

More specifically, it is an object of the present invention to provide an image signal processing technique for processing a decoded image signal obtained by decoding coded data by utilizing a two-dimensional inverse orthogonal transformation, in which the coded data is obtained by coding an image signal by utilizing a two-dimensional orthogonal transformation, which eliminates or reduces block distortions therein.

Another object of the present invention is to provide an image signal processing technique as aforesaid which minimizes the amount of calculations.

A still further object of the present invention is to provide an image signal processing technique as aforesaid which does not adversely affect the image resolution and which accordingly does not adversely affect the picture quality.

Yet another object of the present invention is to provide an image signal processing technique as aforesaid wherein the operation of an associated apparatus for performing such technique is relatively easy and such apparatus is not relatively complex.

A further object of the present invention is to provide an image signal processing technique as aforesaid in which adaptable or adaptive processing is utilized wherein the type of processing performed on the decoded image signal may be changed depending on whether the block distortion is easily observable.

A still further object of the present invention is to provide an image signal processing technique as aforesaid which performs transformation processing on the decoded image signal using a Haar function.

In accordance with an aspect of the present invention, a technique is provided for processing a decoded image signal having a distortion obtained by decoding coded data by utilizing a two-dimensional inverse orthogonal transformation, in which the coded data is obtained by coding an image signal by utilizing a two-dimensional orthogonal transformation. The technique constructs at least one correction block each including a plurality of pixels from a plurality of coded blocks from the decoded image signal and having a distortion on at least one boundary therebetween. The coded blocks of each correction block are adjacent to one another. The technique performs two-dimensional orthogonal transformation of each correction block by utilizing a Haar function so as to form a plurality of coefficients including higher-order side coefficients, lower-order side coefficients and a dc coefficient; adds a correction value to the higher-order side coefficients in accordance with a predetermined number of the lower-order side coefficients when the predetermined number of lower-order side coefficients have values other than zero so as to form a correction coefficient signal for each correction block; and performs two-dimensional inverse orthogonal transformation on the correction coefficient signal of each correction block by utilizing the Haar function so as to obtain a smoothed image signal in which each distortion on each boundary of the coded blocks has been smoothed.

In accordance with another aspect of the present invention, a technique is provided for processing a decoded image signal having a distortion obtained by decoding coded data by utilizing a two-dimensional inverse orthogonal transformation, in which the coded data is obtained by coding an image signal by utilizing a two-dimensional orthogonal transformation. The technique constructs at least one correction block each including a plurality of pixels from a plurality of coded blocks from the decoded image signal and having a distortion on at least one boundary therebetween. The coded blocks of each correction block are adjacent to one another. The technique performs two-dimensional orthogonal transformation of each correction block by utilizing a Haar function so as to form a plurality of coefficients including higher-order side coefficients, lower-order side coefficients and a dc coefficient; calculates a ratio of one of a power sum and absolute value sum of a predetermined number of the lower-order side coefficients to a corresponding one of a power sum and absolute value sum of the higher-order side coefficients; adds a correction value to the higher-order side coefficients in accordance with the predetermined number of the lower-order side coefficients after the higher-order side coefficients have been made zero so as to form a correction coefficient signal for each correction block; performs two-dimensional inverse orthogonal transformation on the correction coefficient signal of each correction block by utilizing the Haar function so as to generate a smoothed image signal in which the distortion on at least one boundary of the coded blocks has been smoothed; and combines the decoded image signal and the smoothed image signal in accordance with the ratio so as to obtain an image signal in which the distortion on at least one boundary of the coded blocks has been substantially eliminated.

Other objects, features and advantages according to the present invention will become apparent from the following detailed description of the illustrated embodiments when read in conjunction with the accompanying drawings in which corresponding components are identified by the same reference numerals.

BRIEF DESCRIPTION OF THE DRAWINGS

FIGS. 9A, 9B, 9C, 9D, 9E and 9F are diagrams to which reference will be made in explaining correction values calculated by the correction coefficient calculation circuit of FIG. 8;

DETAILED DESCRIPTION OF THE PREFERRED EMBODIMENTS

Block distortion smoothing processor apparatus according to the embodiments of the present invention will now be described with reference to FIGS. 1–15.

Figure 1:
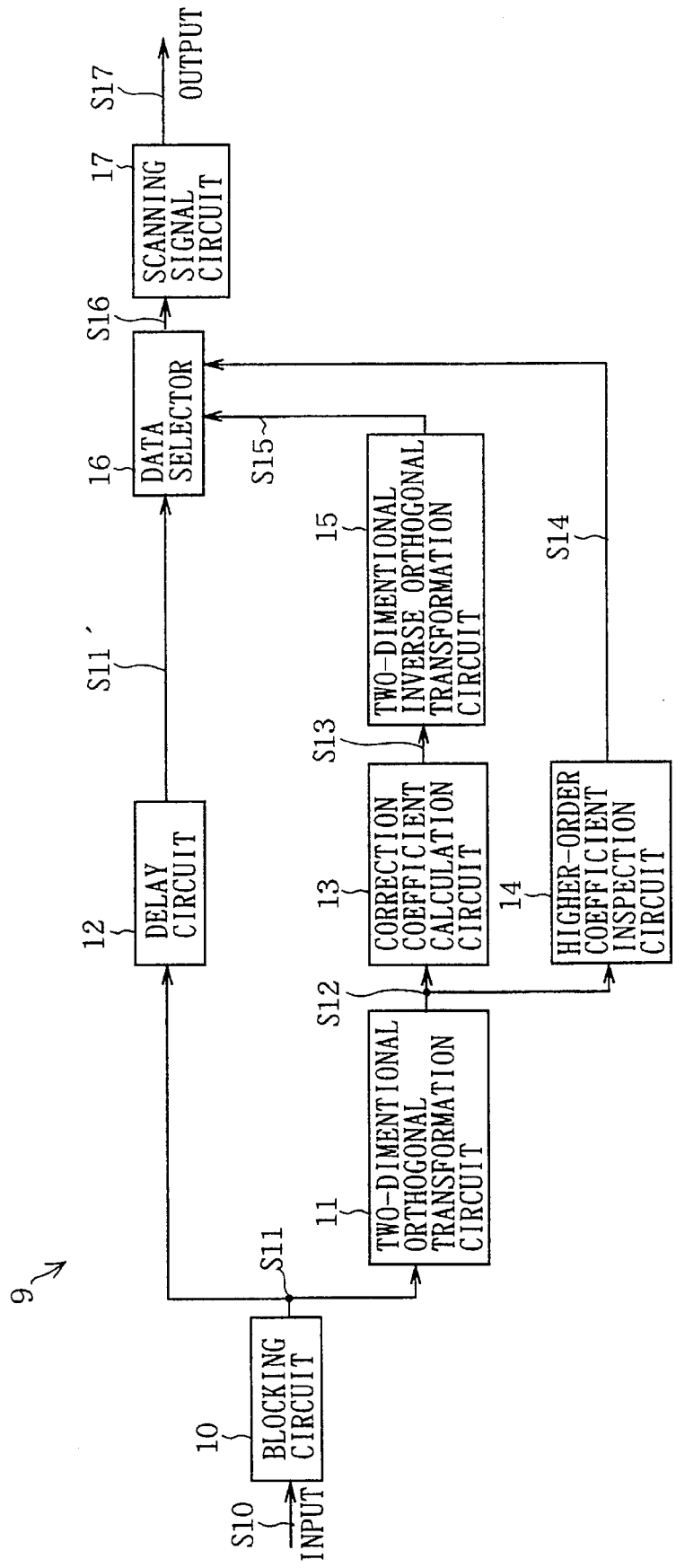
FIG. 1 is a block diagram of a block distortion smoothing processor according to an embodiment of the present invention.

FIG. 1 illustrates a block distortion smoothing processor apparatus 9 according to a first embodiment of the present invention. As shown therein, the block distortion smoothing processor apparatus 9 generally includes a blocking circuit 10, a two-dimensional orthogonal transformation circuit 11, a delay circuit 12, a correction coefficient calculation circuit 13, a higher-order coefficient inspection circuit 14, a two-dimensional inverse orthogonal transformation circuit 15, a data selector 16, and a scanning signal circuit 17 which are arranged as illustrated in FIG. 1.

Figure 17:
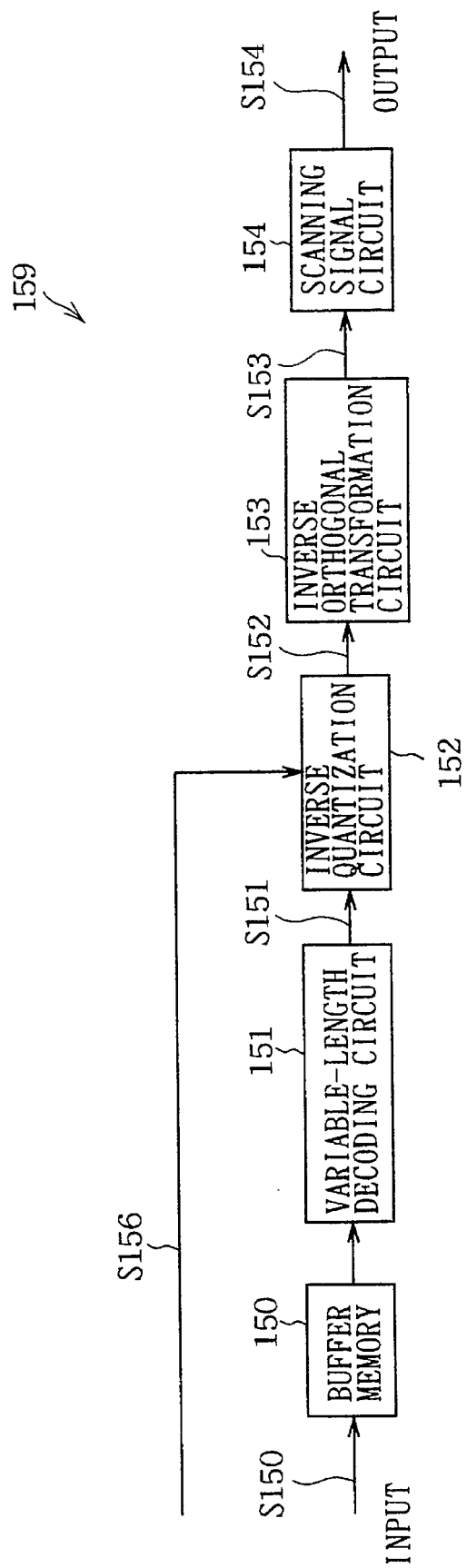
FIG. 17 is a block diagram of an image decoding apparatus.

As shown in FIG. 1, an image signal S10, having a block distortion, is supplied to the blocking circuit 10. Such image signal S10 may be obtained as an output signal of an image decoding apparatus, such as the image decoding apparatus 159 of FIG. 17. That is, in this latter situation, the image signal S10 may be the output signal S154 which is obtained by processing the received coded data signal S150 by the image decoding apparatus 159 which, in turn, is obtained by processing the input image signal S140 by the image coding apparatus 149, as previously described. In this situation, since the output signal S154 is formed as a scanning signal as previously described, such signal may be initially processed by the blocking circuit 10 to form a signal having a block format. Alternatively, the image signal S10 may be the blocked image signal S153 from the inverse orthogonal transformation circuit 153 of FIG. 17.

Figure 4:
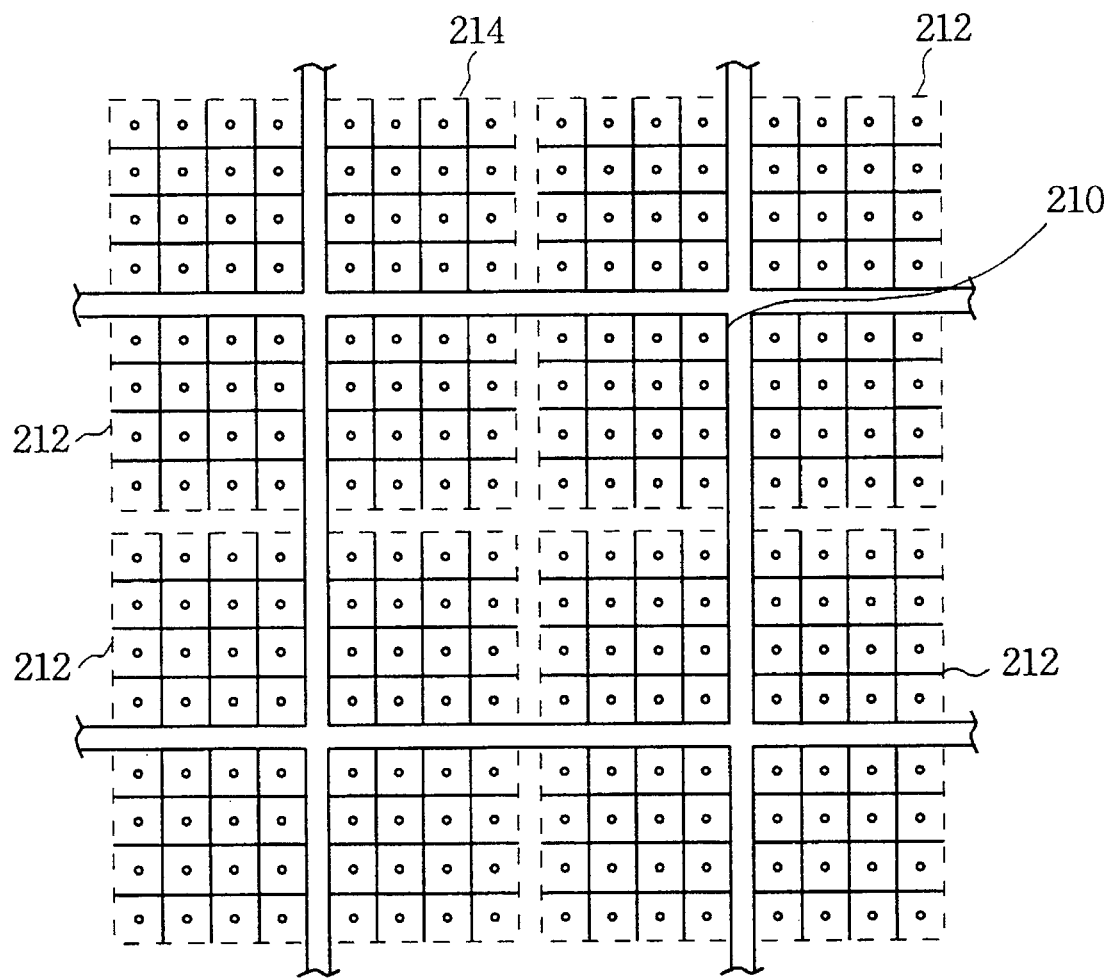
FIG. 4 is an illustration to which reference will be made in explaining the relationship between a coding block and a processing block.

The blocking circuit 10 is adapted to receive the image signal S10 and to form therefrom a plurality of blocks of pixels arranged in a predetermined manner. More specifically, the blocking circuit 10 forms so-called processing blocks each from a predetermined number of pixels from a predetermined number of adjacent coded blocks. As an example, an equal number of pixels 214 from each of four adjacent coded blocks 212 may be utilized to form a processing block 210 as shown in FIG. 4. (In FIG. 4, the coded blocks 212 are identified by broken lines, and the processing block 210 is identified by a solid line.) In this example, each of the coded blocks has an arrangement of 8×8 pixels and each processing block has an arrangement of 8×8 pixels. As a result, in such example, each processing block 210 includes 16 pixels, that is, a 4×4 pixel arrangement, obtained from each of the four adjacent coded blocks so as to form the 8×8 pixel arrangement of the respective processing block. The processing block 210, or the image represented therefrom, is supplied from the blocking circuit 10 as a blocked image signal S11.

Figure 5:
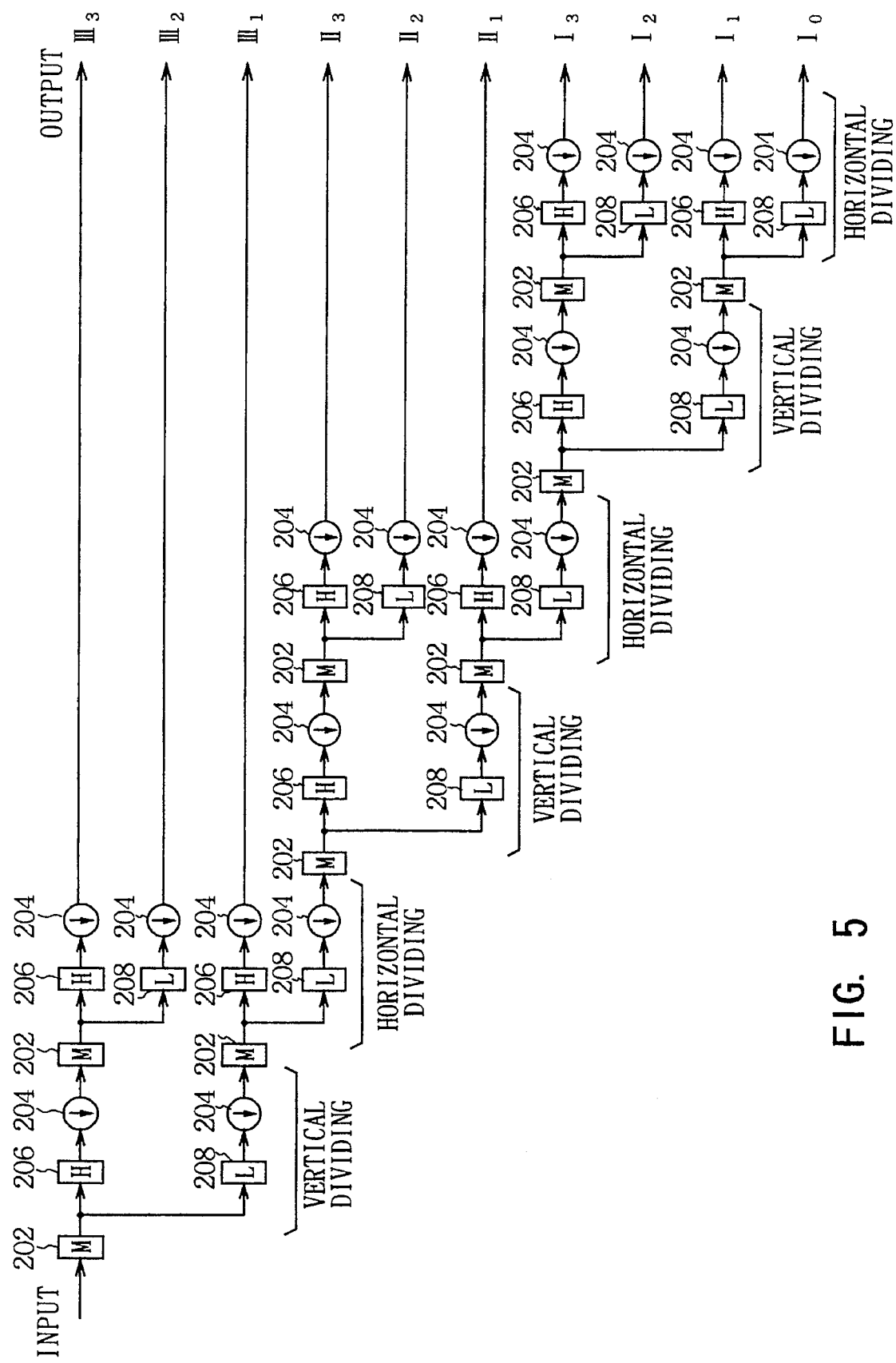
FIG. 5 is a diagram of a two-dimensional orthogonal transformation circuit utilizing a Haar function which may be used in the present block distortion smoothing processors of FIGS. 1–3.

The blocked image signal S11 is supplied to a two-dimensional orthogonal transformation circuit 11 which operates in accordance with a Haar function. An example of such two-dimensional orthogonal transformation circuit 11 is illustrated in FIG. 5. As shown therein, such two-dimensional orthogonal transformation circuit includes a two-dimensional wavelet transformation circuit which uses a Haar function. Such circuit includes a plurality of memory ("M") devices 202, a plurality of ½ down sampling (↓) circuits 204, a plurality of higher-order ("H") dividing filters 206, and a plurality of lower-order ("L") dividing filters 208, which are connected as shown in FIG. 5.

Figure 6A:
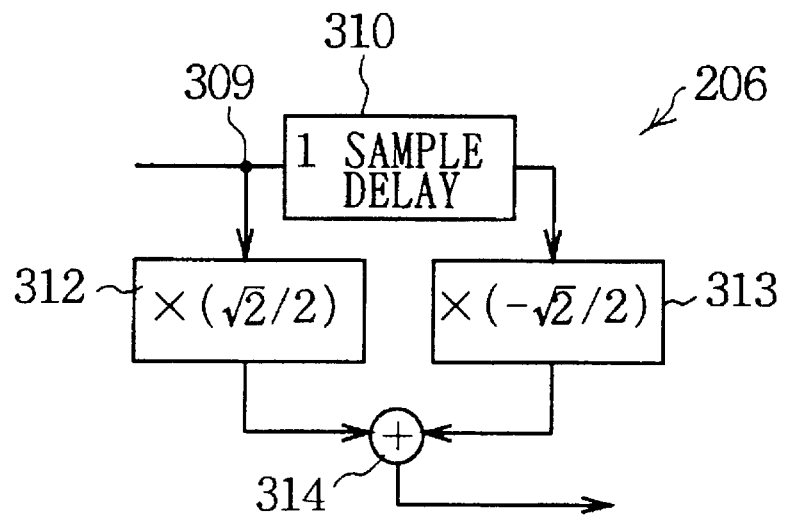
FIGS. 6A and 6B are respective diagrams of a higher-order dividing filter and a lower-order dividing filter which are utilized in the two-dimensional orthogonal transformation circuit of FIG. 5.

An example of a higher-order dividing filter 206 is illustrated in FIG. 6A. That is, the higher-order dividing filter 206 generally includes a one sample delay 310, multiplication circuits 312 and 313, and an adding circuit 314, which arranged as shown in FIG. 6A. More specifically, an input signal is received at an input terminal 309 and supplied therefrom to the multiplication circuit 312, whereupon such signal is multiplied by a predetermined value such as ($\sqrt{2}/2$). The obtained multiplied signal from the multiplication circuit 312 is supplied to one input of the adding circuit 314. The received input signal is further supplied from the terminal 309 to the one sample delay 310, which is adapted to delay the received signal by a time period substantially equivalent to the time associated with one sample. The delayed signal from the one sample delay 310 is supplied therefrom to the multiplication circuit 313, whereupon such signal is multiplied by a predetermined value such as ($-\sqrt{2}/2$). The obtained multiplied signal from the multiplication circuit 313 is supplied to the other input of the adding circuit 314. The adding circuit 314 adds the two received multiplied signals from the multiplication circuits 312 and 313 together so as to form a summed signal which is supplied from the higher-order dividing filter.

Figure 6B:
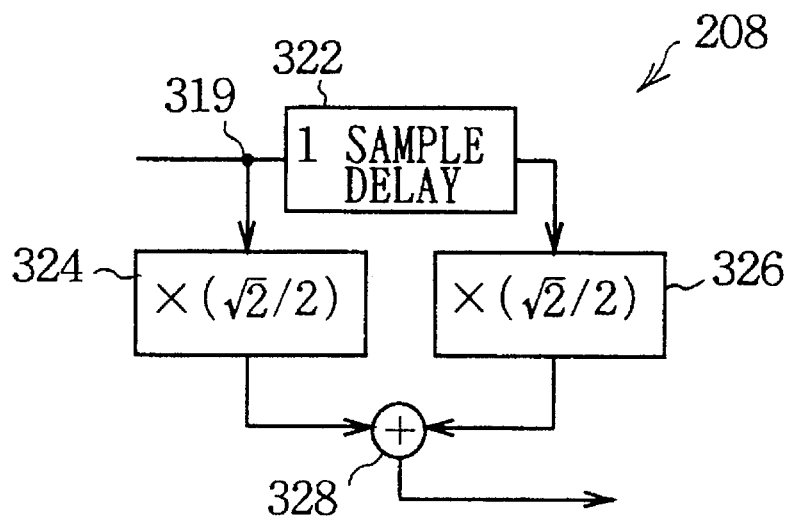

An example of a lower-order dividing filter 208 is illustrated in FIG. 6B. That is, the lower-order dividing filter 208 generally includes a one sample delay circuit 322, multiplication circuits 324 and 326, and an adding circuit 328, which are arranged as shown in FIG. 6B. Such elements of the lower-order dividing filter function in a manner similar to that of the previously described higher-order dividing filter and, accordingly, only a brief description including the differences thereof will be provided. An input signal received at an input terminal 319 is supplied to the one sample delay circuit 322 and the multiplication circuit 324 which, in turn, multiplies the received signal by a predetermined value such as ($\sqrt{2}/2$). A delayed output signal is supplied from the one sample delay circuit 322 to the multiplication circuit 326, whereupon such signal is multiplied by a predetermined value such as ($\sqrt{2}/2$). Multiplied output signals from the multiplication circuits 324 and 326 are added together by the adding circuit 328 so as to form a summed signal which is supplied from the lower-order dividing filter 208.

Figure 7:
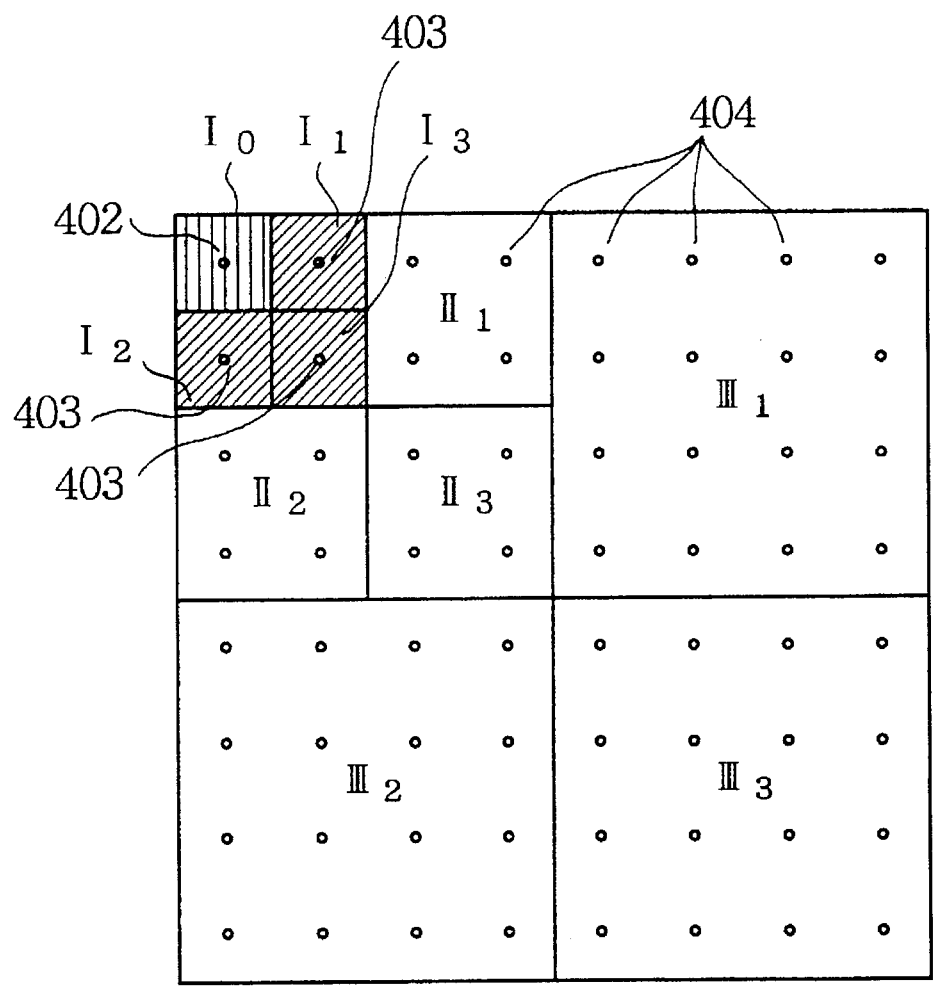
FIG. 7 is a diagram to which reference will be made in explaining the partitioning of 64 coefficients into 10 channels.
Figure 7:
Figure 7:
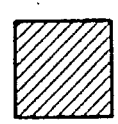

In the transformation circuit of FIG. 5, a value of 64 pixels relating to the lower-order side coefficients which has been partitioned recursively into two alternating parts, that is, alternating vertical and horizontal dividing portions or partitions. Such pixel values are transformed into 64 coefficients which are partitioned or separated by components (for example, a DC component, lower-order components and higher-order components) into 10 channels. Such 10 channels are identified as I0, I1, I2, I3, II1, II2, II3, III1, III2, and III3 as shown in FIG. 5. The arrangement of the 64 coefficients along with their corresponding channels may be as illustrated in FIG. 7. More specifically, as shown in FIG. 7, a DC coefficient 402 is provided on the I0 channel which may be referred to as a DC channel; three lower-order coefficients 403 are respectively provided on the I1, I2 and I3 channels which may be referred to as three lower-order channels; and the remaining coefficients 404, or higher-order components, are respectively provided on channels II1, II2, II3, III1, III2 and III3. Such coefficients are supplied from the two-dimensional orthogonal transformation circuit 11 as a coefficient signal S12. The coefficient signal S12 is supplied to the correction coefficient calculation circuit 13 and the higher-order coefficient inspection circuit 14.

Figure 8:
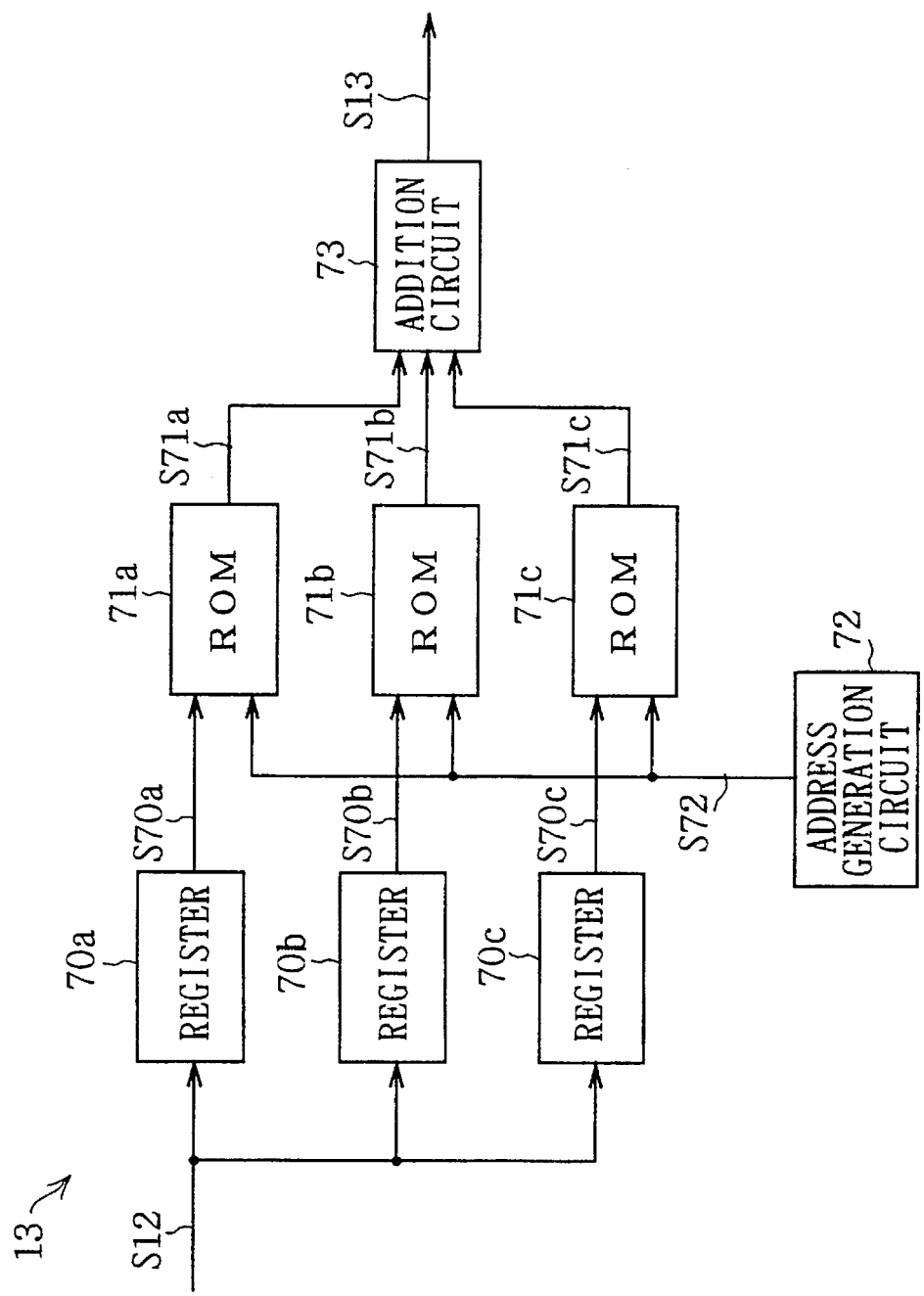
FIG. 8 is a block diagram of a correction coefficient calculation circuit utilized in the present block distortion smoothing processors of FIGS. 1–3.

An example of a configuration of the correction coefficient calculation circuit 13 is illustrated in FIG. 8. Such correction coefficient calculation generally includes registers 70a, 70b and 70c, read only memories (ROMs) 71a, 71b and 71c, an address generation circuit 72, and an addition circuit 73, which are arranged as shown in FIG. 8. More specifically, the coefficient signal S12 from the two-dimensional orthogonal transformation circuit 11 is supplied to the three registers 70a, 70b, and 70c which are adapted to store the lower-order coefficients 403 corresponding to the three lower-order channels I1, I2 and I3 shown in FIG. 7. The stored lower-order coefficients are respectively supplied from the registers 70a, 70b and 70c as coefficient signals S70a, S70b and S70c to ROMs 71a, 71b and 71c. A coefficient address signal S72 from the address generation circuit 72 for the respective block is supplied to the ROMs 71a, 71b and 71c. The signals S70a, S70b and S70c, which correspond to the values of the 3 lower-order coefficients, are held or stored as inputs in the ROMs 71a, 71b, and 71c, during the time in which one block is being processed. Correction value signals S71a, S71b and S71c are respectively formed by the ROMs 71a, 71b, and 71c in accordance with the values of the 3 coefficient signals S70a, S70b, S70c and the coefficient address signal S72 (such as by use of look-up tables or the like having correction values stored therein as a function of coefficient values) for the respective block and supplied to the addition circuit 73. The received correction value signals S71a, S71b and S71c are combined or added by the addition circuit 73 so as to form a correction coefficient signal S13 for each block which is supplied therefrom.

An example of the calculations or processing performed by the correction coefficient calculation circuit 13 is illustrated in FIG. 9. More specifically, the left-hand side of FIGS. 9A, 9B and 9C illustrate values of coefficients received by the correction coefficient calculation circuit 13 and respectively supplied to the ROMs 71a, 71b and 71c in the manner previously described. That is, as shown therein, with regard to the coefficients supplied to the ROM 71a, the lower-order coefficient 403 corresponding to the lower-order channel I1 (FIG. 7) has a value of 100 and the higher-order coefficients have values of zero; with regard to the coefficients supplied to the ROM 71b, the lower-order coefficient 403 corresponding to the lower-order channel I3 (FIG. 7) has a value of 100 and the higher-order coefficients have values of zero; and with regard to the coefficients supplied to the ROM 71c, the lower-order coefficient 403 corresponding to the lower-order channel I2 (FIG. 7) has a value of 100 and the higher-order coefficients have values of zero. In response to such received coefficients, and the coefficient address signal S72, the ROMs 71a, 71b and 71c respectively produce the correction coefficients illustrated in the right-hand side of FIGS. 9A–9C. Such correction coefficients are produced or calculated so that a step-shaped discontinuous line in the central portion of the block may be smoothed without changing the value of the pixel on the boundary of the block. The calculated correction coefficients illustrated in the right-hand side of FIGS. 9A–9C are respectively supplied from the ROMs 71a, 71b and 71c as correction value signals S71a, S71b and S71c to the addition circuit 73 which, in turn, adds such correction signals together to form the correction coefficient signal S13.

Figure 9A:
Figure 9B:
Figure 9C:
Figures 9D, 9E:
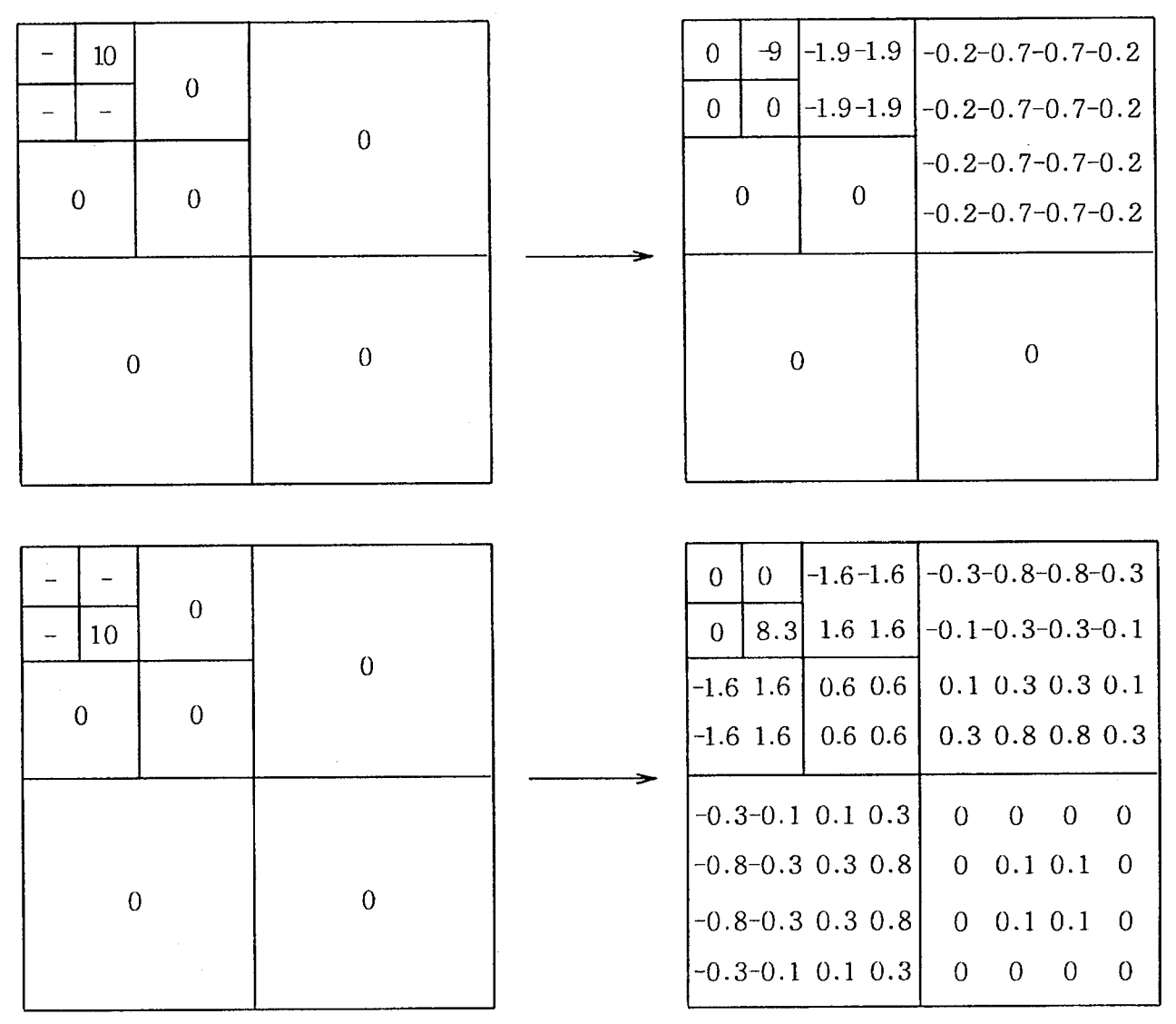
Figure 9F:

FIGS. 9D, 9E and 9F illustrates another example of the processing performed by the correction coefficient calculation circuit 13 and, in particular, the addition performed by the addition circuit 73 thereof. That is, and in a manner similar to that previously described with reference to FIGS. 9A–9C, the left-hand side of FIGS. 9D and 9E illustrate values of coefficients received by the correction coefficient calculation circuit 13 and respectively supplied to two of the ROMs, such as ROMs 71a and 71b, in the manner previously described. That is, as shown therein, with regard to the coefficients supplied to the ROM 71a, the lower-order coefficient 403 corresponding to the lower-order channel I1 (FIG. 7) has a value of 10 and the higher-order coefficients have values of zero; and with regard to the coefficients supplied to the ROM 71b, the lower-order coefficient 403 corresponding to the lower-order channel I3 (FIG. 7) has a value of 10 and the higher-order coefficients have values of zero. In response to such received coefficients, and the coefficient address signal S72, the ROMs 71a and 71b respectively produce the correction coefficients illustrated in the right-hand side of FIGS. 9D and 9E. The calculated correction coefficients illustrated in the right-hand side of FIGS. 9D and 9E are respectively supplied from the ROMs 71a and 71b as correction value signals S71a and S71b to the addition circuit 73 which, in turn, adds such correction signals together as illustrated in FIG. 9F so as to form the correction coefficient signal S13. That is, the addition circuit 73 adds each coefficient value of the values illustrated in FIG. 9D with the corresponding coefficient value in FIG. 9E. For example, the coefficient value corresponding to the I1 channel in the right-hand side of FIG. 9D which has a value of −9 is added to the corresponding coefficient value in the right-hand side of FIG. 9E which has a value of 0 so as to form the sum −9 as shown in the corresponding location of the right-hand side of FIG. 9F. As another example, the coefficient value −1.9 which is immediately to the right of the −9 coefficient corresponding to the I1 channel of the right-hand side of FIG. 9D is added to the corresponding coefficient value of −1.6 in the right-hand side of FIG. 9E so as to obtain a sum value of −3.5 as shown in the corresponding location of the right-hand side of FIG. 9F.

Figure 10:
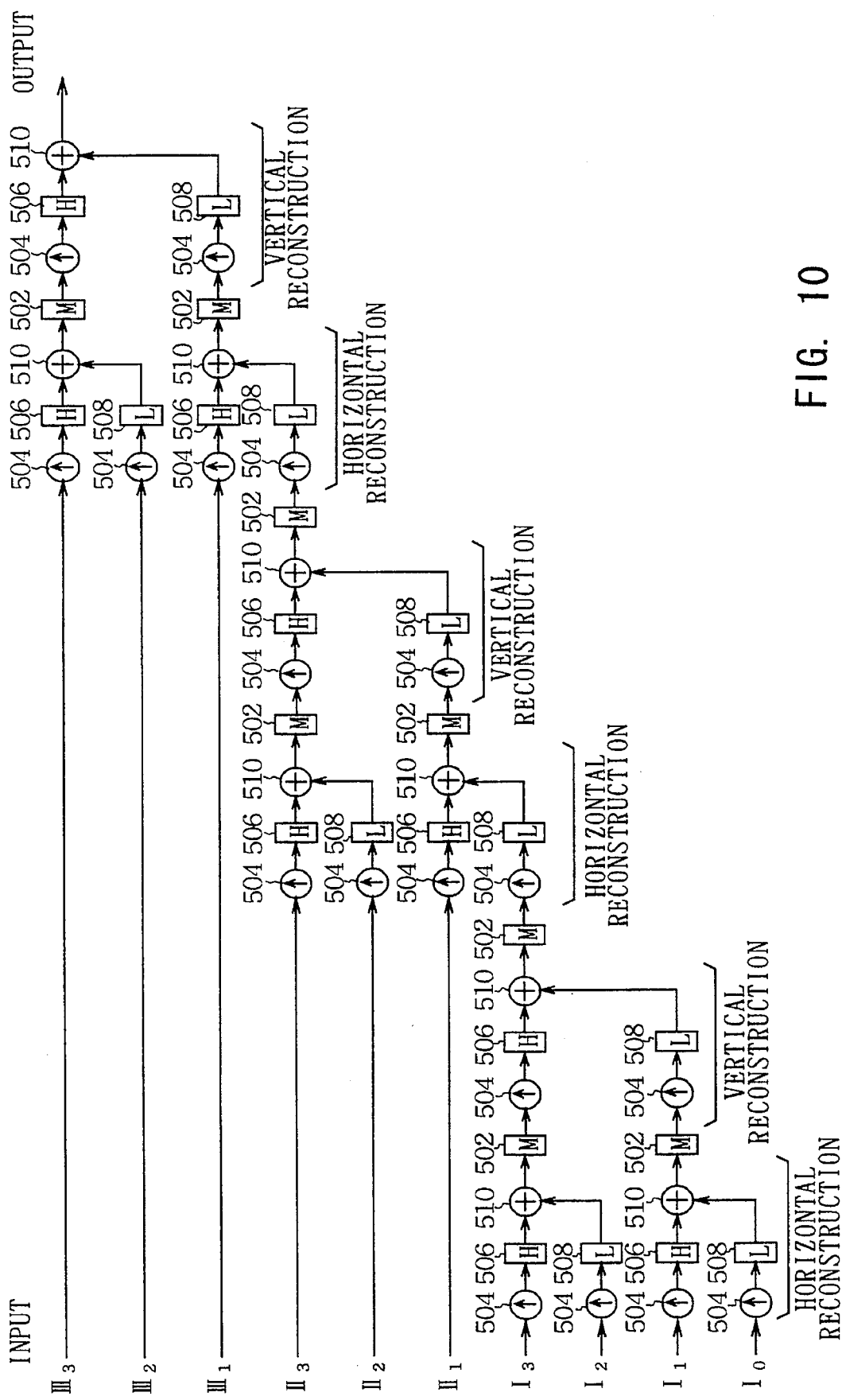
FIG. 10 is a diagram of a two-dimensional inverse orthogonal transformation circuit utilizing a Haar function which may be used in the present block distortion smoothing processors of FIGS. 1–3.

The correction coefficient signal S13 from the correction coefficient calculation circuit 13 is supplied to the two-dimensional inverse orthogonal transformation circuit 15 which is adapted to operate in accordance with a Haar function. An example of such two-dimensional inverse orthogonal transformation circuit 13 is shown in FIG. 10. As is to be appreciated, such two-dimensional inverse orthogonal transformation circuit 15 which uses a Haar function operates in a substantially inverse manner to the previously described two-dimensional orthogonal transformation circuit 11 of FIG. 5. This two-dimensional inverse orthogonal transformation circuit 15 includes a two-dimensional wavelet inverse transformation circuit. Such circuit generally includes a plurality of memory ("M") devices 502, a plurality of 2×up sampling (↑) circuits 504, a plurality of higher-order ("H") reconstruction filters 506, a plurality of lower-order ("L") reconstruction filters 508, and a plurality of adding circuits 510, which are connected as shown in FIG. 10.

Figure 11A:
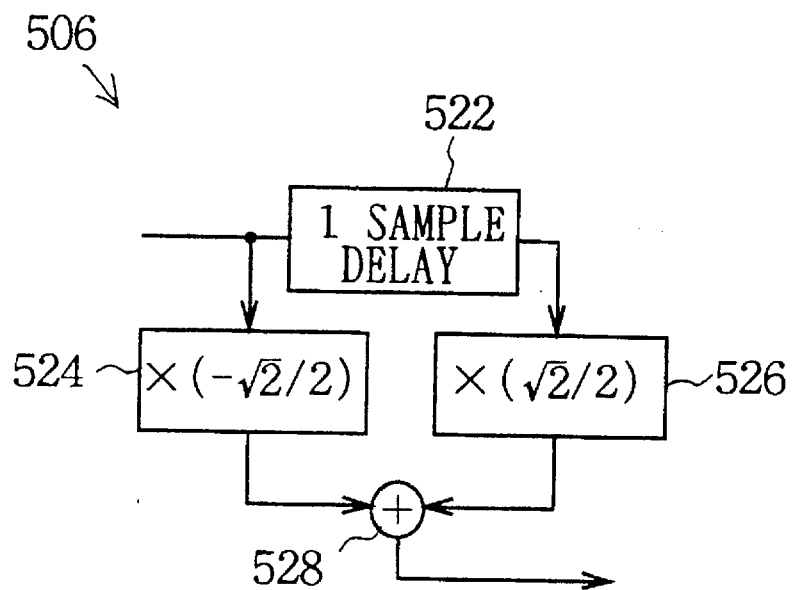
FIGS. 11A and 11B are respective diagrams of a higher-order reconstruction filter and a lower-order reconstruction filter which are utilized in the two-dimensional inverse orthogonal transformation circuit of FIG. 10.

An example of the higher-order ("H") reconstruction filter 506 is illustrated in FIG. 11A. As shown therein, the higher-order reconstruction filter 506 generally includes a one sample delay circuit 522, multiplication circuits 524 and 526, and an adding circuit 528, which are arranged as shown in FIG. 11A. Such circuits of the higher-order reconstruction filter 506 of FIG. 11A, with the exception of the multiplication values of the multiplication circuits 524 and 526, are substantially similar to those of the higher-order dividing filter 206 of FIG. 6A and, as such, will not be further described herein. As shown in FIG. 11A, the multiplication circuit 524 multiplies a received signal by a predetermined value such as $(-\sqrt{2}/2)$, whereas the multiplication circuit 526 multiplies an output signal from the one sample delay circuit 522 by a predetermined value such as $(\sqrt{2}/2)$.

Figure 11B:
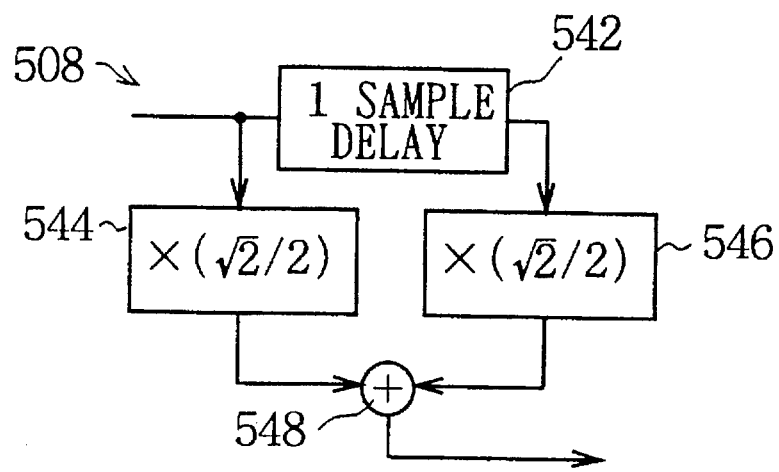

An example of a lower-order reconstruction filter ("L") 508 is illustrated in FIG. 11B. As shown therein, the lower-order reconstruction filter 508 generally includes a one sample delay circuit 542, multiplication circuits 544 and 546, and an adding circuit 548, which are arranged as shown in FIG. 11B. Such circuits of the lower-order reconstruction filter 540 of FIG. 11B are substantially similar to those of the lower-order dividing filter 208 of FIG. 6B and, as such, will not be further described herein.

In the transformation circuit 15, the 64 coefficients are successively reconstructed alternately from the lower-order side coefficient in the horizontal and vertical directions so as to be inverse-transformed into a blocked image signal S15 representing 64 pixels. This blocked image signal S15 is supplied to the data selector 16 as shown in FIG. 1.

As shown in FIG. 1, the coefficient signal S12 from the two-dimensional orthogonal transformation circuit 11 is further supplied to the higher-order coefficient inspection circuit 14. Such higher-order coefficient inspection circuit is adapted to inspect the received 64 coefficients and determine whether the 60 higher-order side coefficients (i.e., those coefficients other than the dc coefficient and the three lower-order side coefficients respectively corresponding to the DC channel I0 and the lower-order channels I1, I2 and I3 of FIG. 7) each have a value equal to zero. If each of such higher-order side coefficients has a value of zero and if any of the three-lower order side coefficients (other than the DC coefficient) have a value other than zero, then a distortion exists. In other words, an easily observable distortion exists when each of the higher-order coefficients has a value of zero and any of the lower-order side coefficients has a value other than zero. The result of this inspection and determination is supplied as a switching signal S14 from the higher-order coefficient inspection circuit 14 to the data selector 16.

As shown in FIG. 1, the blocked image signal S11 from the blocking circuit 10 is further supplied to a delay circuit 12. The delay circuit 12 is adapted to delay the received signal by a predetermined amount of time, such as the time associated with the processing of the blocked image signal S11 from the two-dimensional orthogonal transformation circuit 11 to the data selector 16. A delayed blocked image signal S11' is supplied from the delay circuit 12 to the data selector 16.

The data selector 16 is adapted to select one of the received signals, that is, one of the blocked image signal S15 from the two-dimensional inverse orthogonal transformation circuit 15 and the delayed blocked image signal S11' from the delay circuit 12, in accordance with the switching signal S14. That is, the data selector 16 selects the blocked image signal S15 from the two-dimensional inverse orthogonal transformation circuit 15 (which had been processed so as to smooth the block distortion as previously described) when the switching signal S14 indicates that a distortion exists (i.e., each of the above-described 60 higher-order side coefficients have a value equal to zero). On the other hand, when the switching signal S14 indicates that such distortion does not exist (i.e., not all of the above-described 60 higher-order side coefficients have a value equal to zero), the data selector 16 selects the unprocessed decoded delayed blocked image signal S11', which is synchronized with the blocked image signal S15 from the inverse transformation circuit 15 due to the delay circuit 12 as previously described. The selected one of the blocked image signal S15 and the delayed blocked image signal S11' is supplied from the data selector 16 as a blocked image signal S16.

Therefore, if the blocked image signal S11 has a distortion, such as a step-shaped distortion on a boundary or boundaries of a coded block(s), such signal is processed by the two-dimensional orthogonal transformation circuit 11, the correction coefficient calculation circuit 13 and the two-dimensional inverse orthogonal transformation circuit 15 so as to effectively smooth the otherwise easily observable distortion and such resulting processed signal S15 is selected by the data selector 16 and supplied therefrom as the blocked image signal S16. On the other hand, if the blocked image signal S11 does not have such distortion, as determined by the higher-order coefficient inspection circuit 14, the data selector 16 selects the delayed blocked image signal S11' which is supplied therefrom as the blocked image signal S16. Accordingly, the block distortion smoothing processor apparatus 9 provides adaptable or adaptive processing wherein the type of processing performed on a decoded image signal is changed depending on whether a block distortion, such as a block distortion which is easily observable, is detected in such signal.

The blocked image signal S16 from the data selector 16 is supplied to the scanning signal circuit 17. Such scanning signal circuit is adapted to process the received signal S16 so as to form a scanning signal therefrom which is substantially identical in form to the input image signal. Such scanning signal is supplied as a processed image signal S17 from the block distortion smoothing processor apparatus 9 of FIG. 1.

Therefore, the above-described block distortion smoothing processor apparatus 9 receives a restored image signal S10 obtained by decoding coded data by using two-dimensional inverse orthogonal transformation in which the coded data is obtained by coding an image signal using two-dimensional orthogonal transformation. A processing block is formed from such received restored image signal which includes pixels from a number (such as four) of adjacent coded blocks. Such processing block is processed by the two-dimensional orthogonal transformation circuit 11 which operates in accordance with a Haar function so as to form a plurality of coefficients. Correction values are added to such coefficients by the correction coefficient calculation circuit 13 and the obtained corrected coefficients are processed by the two-dimensional inverse orthogonal transformation circuit 15 so as to effectively smooth an otherwise easily observable distortion which may exist. The coefficients from the circuit 11 are inspected by the higher-order coefficient inspection circuit 14 to determine if such distortion exists. If a distortion is determined to exist, then a processed output signal from the two-dimensional inverse orthogonal transformation circuit 15 is selected by the data selector 16 and supplied to the scanning signal circuit 17, whereupon the processed image signal S17 is formed and supplied from the present apparatus 9. If, however, a distortion is determined not to exist, then the data selector 16 selects the delayed blocked image signal S11' and supplies the same to the scanning signal circuit 17 so as to output the processed image signal S17.

Thus, by utilizing the above-described block distortion smoothing processor apparatus, an image signal may be obtained in which an otherwise easily observable step-shaped distortion on the boundary or boundaries of a coded block(s) has been smoothed. Further, as is to be appreciated, such apparatus can be realized or fabricated and operated in a relatively easy manner.

Figure 2:
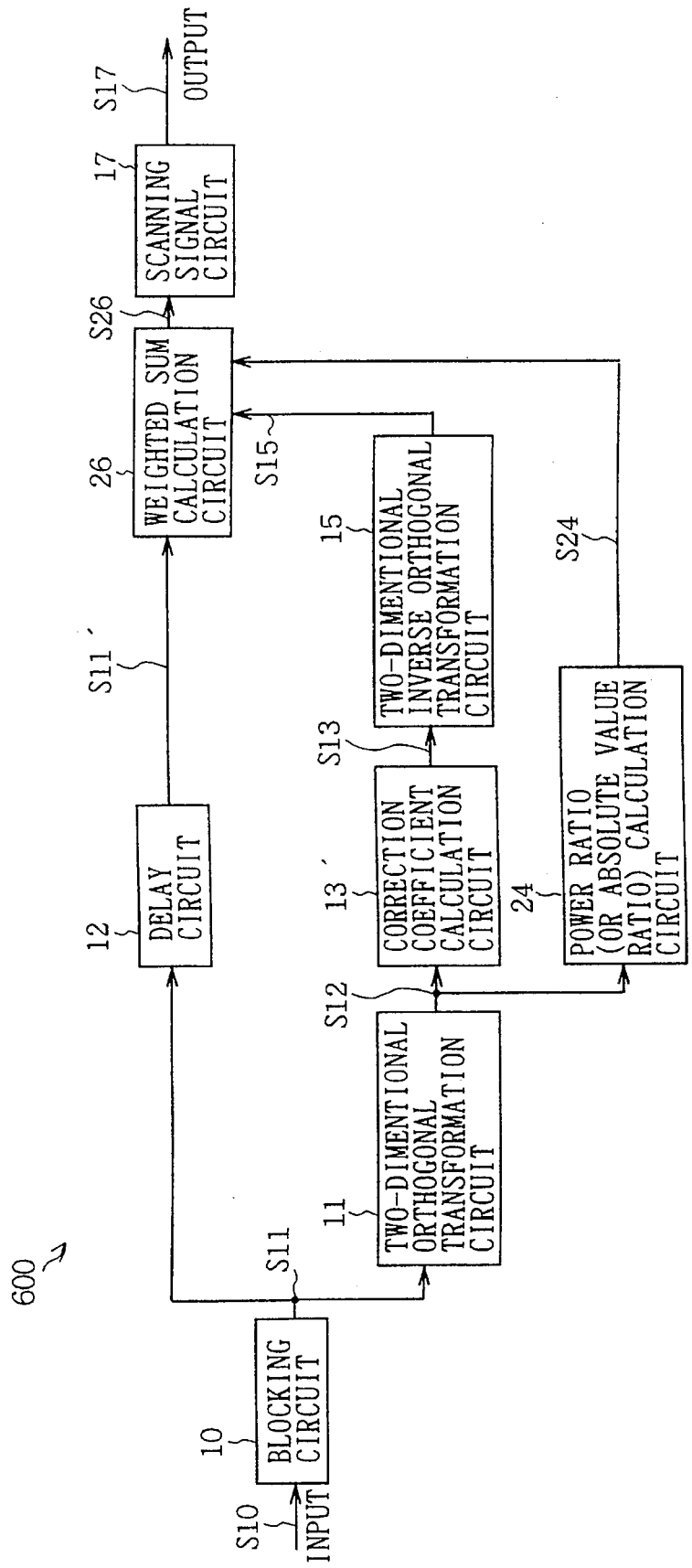
FIG. 2 is a block diagram of a block distortion smoothing processor according to a second embodiment of the present invention.

FIG. 2 illustrates a block distortion smoothing processor apparatus 600 according to a second embodiment of the present invention. As shown therein, the block distortion smoothing processor apparatus 600 generally includes a blocking circuit 10, a two-dimensional orthogonal transformation circuit 11, a delay circuit 12, a correction coefficient calculation circuit 13', a two-dimensional inverse orthogonal transformation circuit 15, a power ratio (or absolute value ratio) calculation circuit 24, a weighted sum calculation circuit 26, and a scanning signal circuit 17, which are arranged as illustrated in FIG. 2. The blocking circuit 10, the two-dimensional orthogonal transformation circuit 11, the delay circuit 12, the two-dimensional inverse orthogonal transformation circuit 15 and the scanning signal circuit 17 of the block distortion smoothing apparatus 600 are substantially similar to and function in a substantially similar manner as those of the block distortion smoothing processor apparatus 9 of FIG. 1 and, as such, will not be further described herein. However, unlike the block distortion smoothing processor apparatus 9, as hereinafter more fully described, the block distortion smoothing processor apparatus 600 utilizes the power ratio (or absolute value ratio) calculation circuit 24, the weighted sum calculation circuit 26, and a weighted signal S24 in place of the higher-order coefficient inspection circuit 14, the data selector 16 and the switching signal S14 of the apparatus 9. Further, the correction coefficient calculation circuit 13' may be adapted to set the higher-order side coefficients to zero and to add correction values to the coefficients as hereinafter more fully described.

Figure 12:
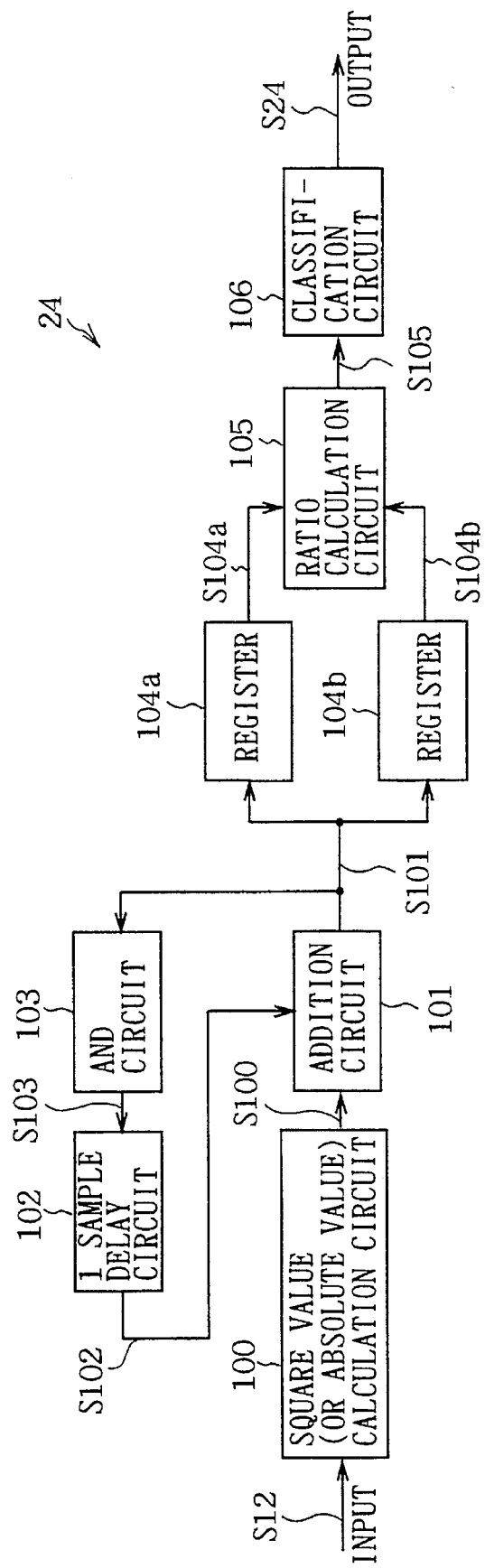
FIG. 12 is a block diagram of a power ratio (or absolute value ratio) calculation circuit utilized in the present block distortion smoothing processor of FIG. 2.

FIG. 12 illustrates the power ratio or absolute value ratio calculation circuit 24 in more detail. Such power ratio or absolute value ratio calculation circuit 24 generally includes a square value (or absolute value) calculation circuit 100, an addition circuit 101, a one sample delay circuit 102, an AND circuit 103, registers 104a and 104b, a ratio calculation circuit 105, and a classification circuit 106 which are arranged as shown in FIG. 12. As shown therein, the coefficient signal S12 from the two-dimensional orthogonal transformation circuit 11 (FIG. 2) is supplied to the square value (or absolute value) calculation circuit 100, such that the coefficients are successively supplied thereto starting from the lower-order side coefficients. The square value (or absolute value) calculation circuit 100, which may include a read only memory (ROM) or the like, is adapted to calculate or produce a square value (or absolute value) for each coefficient of the coefficient signal S12 so as to form a square value (or absolute value) signal S100. Such signal S100 is supplied to the addition circuit 101.

The addition circuit 101 is adapted to receive the square value (or absolute value) signal S100 and an output signal S102 from the 1-sample delay circuit 102 and to add such received signals together so as to form a summed signal S101. The summed signal S101 is supplied to the AND circuit 103 and to the registers 104a and 104b in a manner as hereinafter more fully described. The AND circuit 103 supplies an addition intermediate signal S103 to the one sample delay circuit which, in turn, is adapted to delay the received signal S103 by a time period corresponding to the processing of one sample and to supply therefrom the output signal S102. As a result, cumulative addition is performed on the square value (or absolute value) of the 3 lower-order side coefficients other than the dc coefficient and the 60 higher-order side coefficients. The AND circuit 103 resets the cumulative addition processing so that the cumulative results may be stored in the registers 104a and 104b in the manner as hereinafter more fully described.

As previously described, the registers 104a and 104b receive the summed signal S101 and store the cumulative addition result in a predetermined manner. That is, when the summed signal or addition result S101 is the addition result of the square value (or absolute value) of the 3 lower-order side coefficients, such signal is stored in the register 104a. On the other hand, when the summed signal or addition result S101 is the addition result of the square value (or absolute value) of the 60 higher-order side coefficients, such signal is stored in the register 104b.

Stored addition signals S104a and S104b obtained from the registers 104a and 104b, respectively, are supplied to the ratio calculation circuit 105. Such ratio calculation circuit 105, which may include a divider circuit or the like, is adapted to calculate or produce a ratio of the addition signal S104a of the square value (or absolute value) of the 3 lower-order side coefficients obtained from the register 104a and the addition signal S104b of the square value (or absolute value) of the 60 higher-order side coefficients from the register 104b. The obtained ratio is supplied as a ratio signal S105 from the ratio calculation circuit 105 to the classification circuit 106. Such classification circuit 106, which may include a ROM or the like, is adapted to classify the received ratio signal S105 into one of a predetermined number of levels, such as 4 levels, which is supplied therefrom as a weighted signal S24.

Referring back to FIG. 2, the correction coefficient calculation circuit 13' receives the coefficient signal S12 from the two-dimensional orthogonal transformation circuit 11. Such correction coefficient calculation circuit is adapted to set the higher-order side coefficients (e.g., the above-described 60 higher-order side coefficients) to zero. The correction coefficient calculation circuit 13' is further adapted to add a respective correction value to predetermined one or ones of the received coefficients in accordance with the values of a selected coefficient(s). For example, the correction coefficient calculation circuit 13' may add a respective correction value(s) to the higher-order side coefficients in accordance with the values of the lower-order side coefficients. Such processing by the correction coefficient calculation circuit 13' may be accomplished by use of one or more memory devices (such as ROMs) included within such circuit 13' in a manner similar to that performed by the previously described correction coefficient calculation circuit 13 of FIGS. 1 and 8. That is, upon receiving the coefficient signal S12, the correction coefficient calculation circuit 13' sets the higher-order side coefficients to zero and adds a respective correction value to the higher-order side coefficients in accordance with the values of the lower-order side coefficients by utilizing look-up tables or the like in the ROMs. Based upon such coefficient values, the correction coefficient calculation circuit 13' forms a correction coefficient signal S13 and supplies the same to the two-dimensional inverse orthogonal transformation circuit 15 as shown in FIG. 2.

Figure 13:
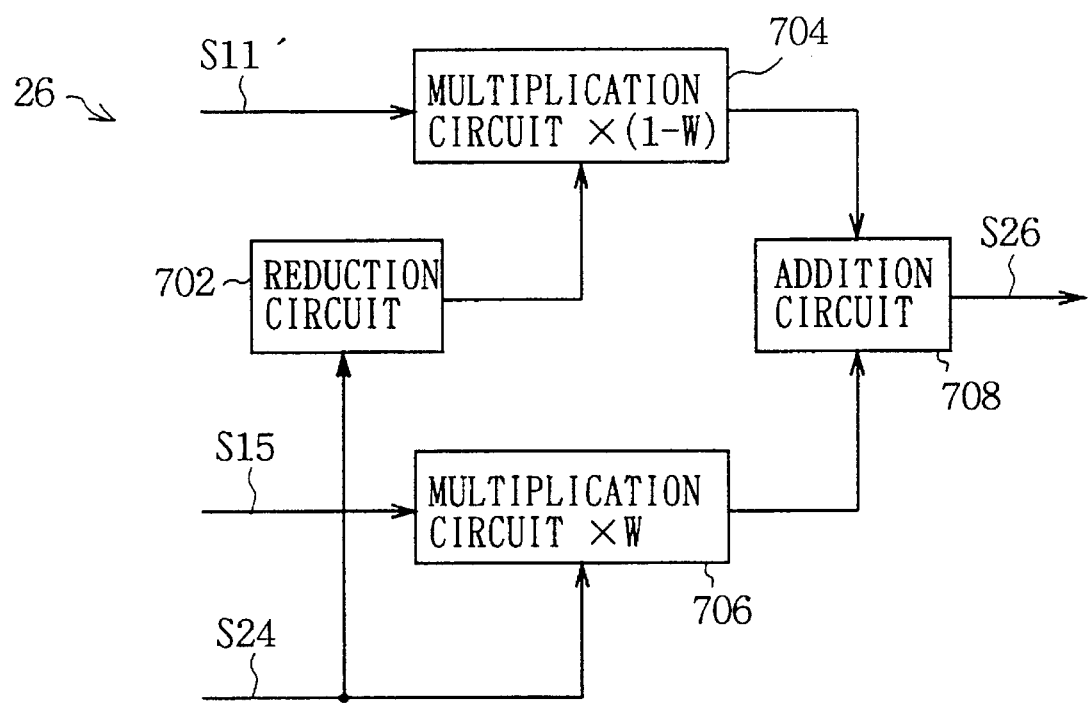
FIG. 13 is a block diagram of a weighted sum calculation circuit utilized in the present block distortion smoothing processor of FIG. 2.

As shown in FIG. 2, the weighted sum calculation circuit 26 receives the delayed blocked image signal S11' from the delay circuit 12, the blocked image signal S15 from the two-dimensional inverse orthogonal transformation circuit 15, and the weighted signal S24 from the power ratio (or absolute value ratio) calculation circuit 24. Such weighted sum calculation circuit 26 is illustrated in FIG. 13. The weighted sum calculation circuit 26 generally includes a reduction circuit 702, multiplication circuits 704 and 706, and an addition circuit 708, which are arranged as shown in FIG. 13. The "W" illustrated in the multiplication circuits 704 and 706 represents a weighting factor which corresponds to the weighted signal S24.

Therefore, as shown in FIG. 13, the blocked image signal S15 and the weighted signal S24 are supplied to the multiplication circuit 706 so as to be multiplied together. The multiplication product obtained by the multiplication circuit 706 is supplied to the addition circuit 708. The weighted signal S24 is further supplied to the reduction circuit 702 which is adapted to calculate or produce the term (1-W) and to supply the same to the multiplication circuit 704. The multiplication circuit 704 further receives the delayed blocked image signal S11' and multiplies such signal by the term (1-W) and supplies the obtained multiplication product to the addition circuit 708. The addition circuit 708 adds the received multiplication products together so as to form a blocked image signal S26 which is supplied therefrom.

Thus, based upon the weighted signal S24, the weighted sum calculation circuit 26 calculates a weighted sum of the unprocessed image signal S11' and the image signal S15 which had been processed as previously described so as to smooth the block distortion. As a result, the weighted sum calculation circuit 26 produces and supplies therefrom the blocked image signal S26 in which an otherwise easily observable step-shaped distortion on a boundary or boundaries of the coded block(s) is smoothed step by step.

Thus, the block distortion smoothing processor apparatus 600 receives a restored image S10 having distortions that is obtained by coding with two-dimensional orthogonal transformation and decoding with two-dimensional inverse orthogonal transformation. Such apparatus forms a correction block signal S11 which equally includes the pixels of four coded blocks adjacent to one another and has a distortion. Two-dimensional orthogonal transformation using a Haar function is performed at a unit of the correction block S11 so as to form a plurality of coefficients. The higher-order coefficients are set to zero and correction values are respectively added to the higher-order coefficients in accordance with the values of the lower-order side coefficients. Thereafter, two-dimensional inverse orthogonal transformation processing is performed using a Haar function in a unit of the correction block to the entire image so as to generate the image signal S15 in which easily observable step-shaped distortions on the boundaries of the coded blocks have been smoothed. A ratio of a power sum (or absolute value sum) of values of three lower-order side coefficients (other than a dc coefficient) and a power sum (or absolute value sum) of values of the coefficients other than the dc coefficient and the three lower-order side coefficients is calculated so as to form the weighted signal S24. Such weighted signal is supplied to the weighted sum calculation circuit 26 along with the image signal S15 and the unprocessed restored image signal S11' so as to produce the blocked image signal S26 in which the distortion is smoothed as previously described.

Therefore, the above-described block distortion smoothing processor apparatus 600 is able to produce an image in which the step-shaped distortion on a boundary or boundaries of the coded block(s) has been smoothed step by step. Further, by utilizing such apparatus, the application or processing range may be expanded as compared with the block distortion smoothing processor apparatus 9 of FIG. 1.

Figure 3:
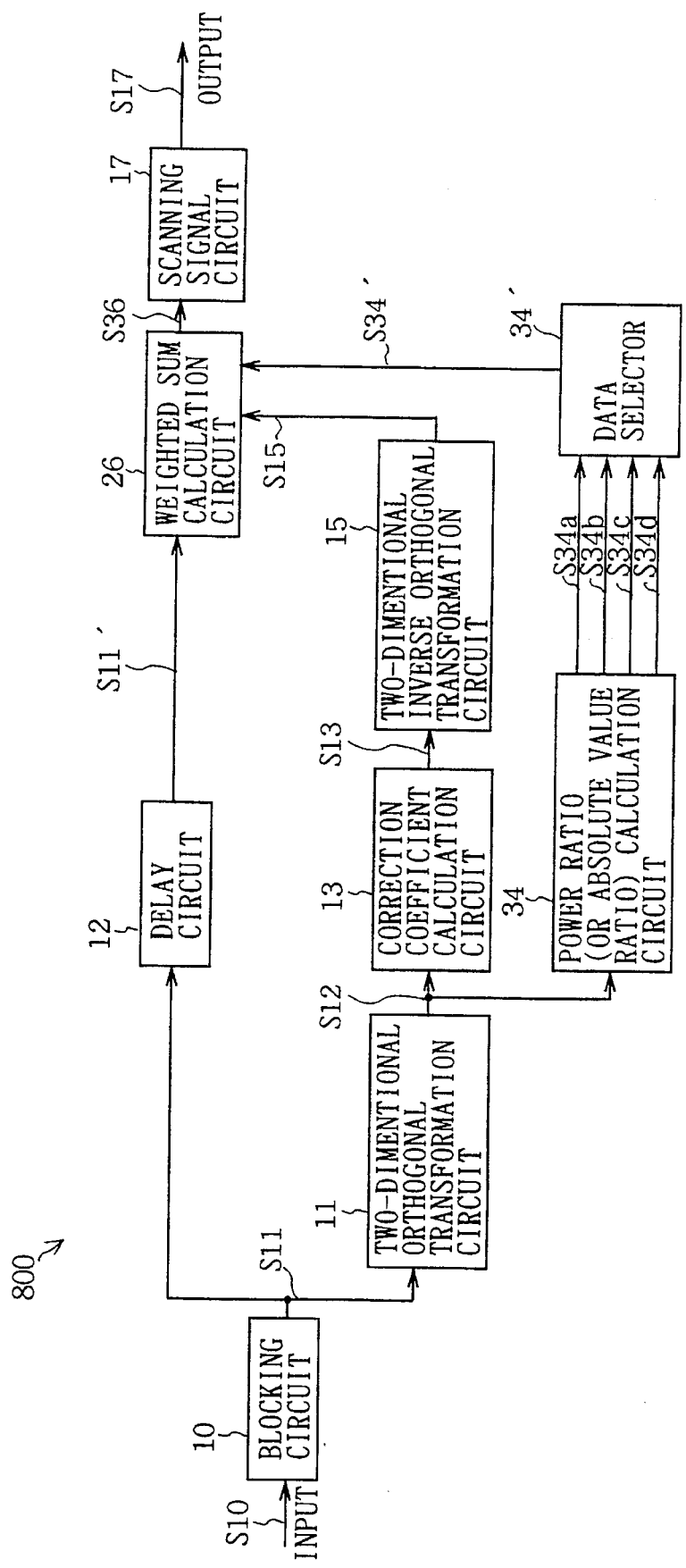
FIG. 3 is a block diagram of a block distortion smoothing processor according to a third embodiment of the present invention.

FIG. 3 illustrates a block distortion smoothing processor apparatus 800 according to a third embodiment of the present invention. As shown therein, the block distortion smoothing processor apparatus 800 generally includes a blocking circuit 10, a two-dimensional orthogonal transformation circuit 11, a delay circuit 12, a correction coefficient calculation circuit 13', a two-dimensional inverse orthogonal transformation circuit 15, a power ratio (or absolute value ratio) calculation circuit 34, a weighted sum calculation circuit 26, a data selector 34', and a scanning signal circuit 17, which are arranged as illustrated in FIG. 3. The blocking circuit 10, the two-dimensional orthogonal transformation circuit 11, the delay circuit 12, the correction coefficient calculation circuit 13', the two-dimensional inverse orthogonal transformation circuit 15, the weighted sum calculation circuit 26 and the scanning signal circuit 17 of the block distortion smoothing apparatus 800 are substantially similar to and function in a substantially similar manner as those of the block distortion smoothing processor apparatus 600 of FIG. 2 and, as such, will not be further described herein. However, as hereinafter more fully described, the block distortion smoothing processor apparatus 800 differs from the block distortion smoothing processor apparatus 600, in that, the power ratio (or absolute value ratio) calculation circuit 24 is substantially replaced by the power ratio (or absolute value ratio) calculation circuit 34 and the data selector 34'. The power ratio (or absolute value ratio) calculation circuit 34 is adapted to supply four weighted signals S34a, S34b, S34c, and S34d to the data selector 34' which, in turn, selects therefrom the weighted signal(s) to be supplied to the weighted sum calculation circuit 26, as hereinafter more fully described.

Figure 14:
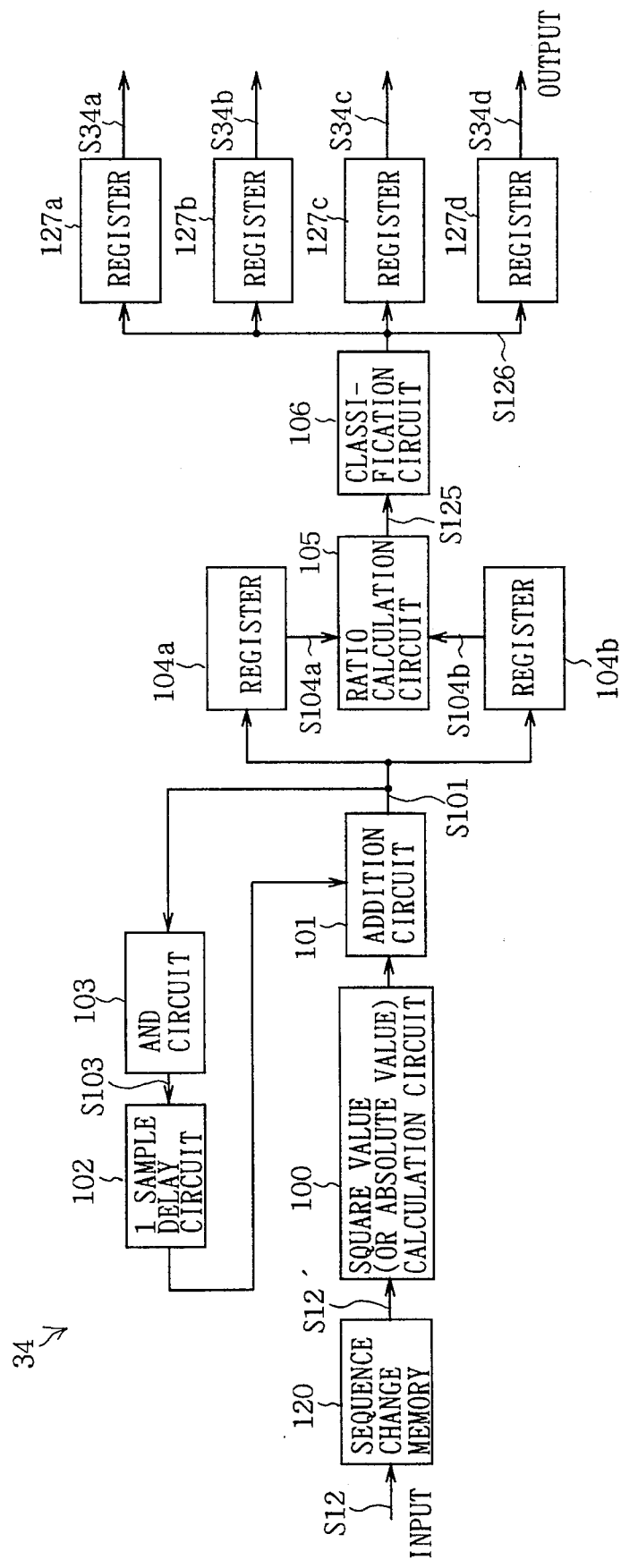
FIG. 14 is a block diagram of a power ratio (or absolute value ratio) calculation circuit utilized in the present block distortion smoothing processor of FIG. 3.

FIG. 14 illustrates the power ratio (or absolute value ratio) calculation circuit 34. As is to be appreciated, with the exception of the addition of a sequence change memory 120 and four output registers 127a, 127b, 127c, and 127d, the power ratio (or absolute value ratio) calculation circuit 34 is substantially similar to the power ratio (or absolute value ratio) calculation circuit 24 of FIG. 12. Accordingly, only the differences between the circuit 34 and the circuit 24 will be described.

Figure 15A:
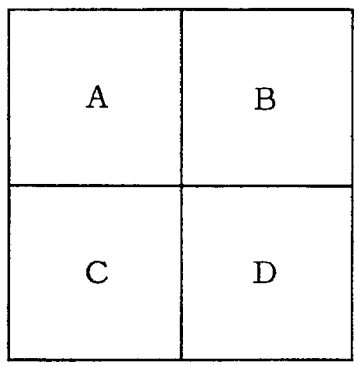
FIGS. 15A, 15B, 15C, 15D and 15E are diagrams to which reference will be made in explaining which higher-side coefficients are utilized for reconfigurating four regions of block image signals.
Figure 15B:
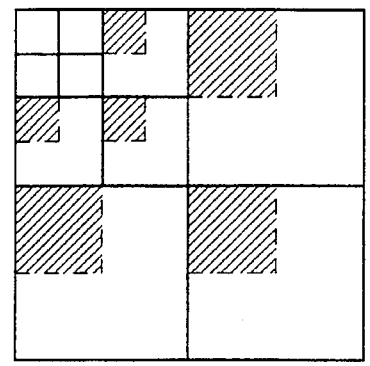
Figure 15C:
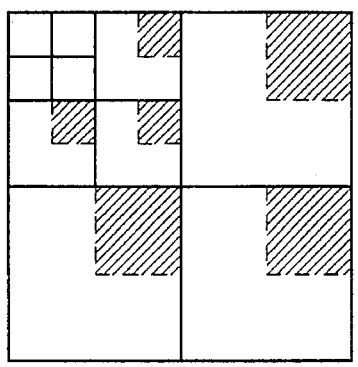
Figure 15D:
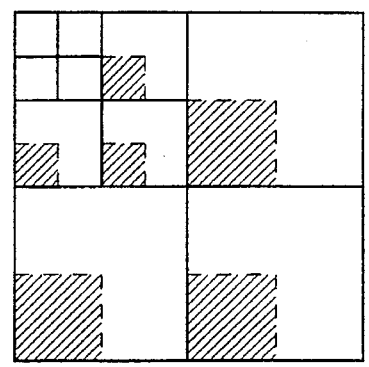
Figure 15E:
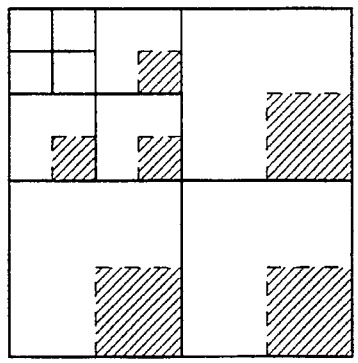
Figure 16:
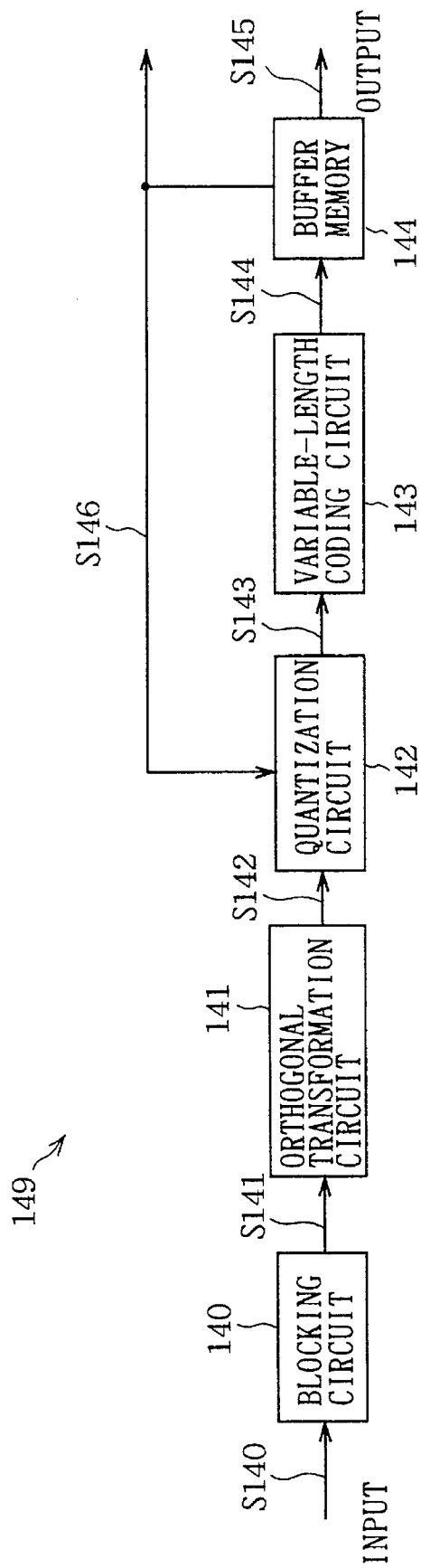
FIG. 16 is a block diagram of an image coding apparatus.

FIG. 15A illustrates four regions A, B, C and D which may be utilized in the reconstruction of a blocked image signal having 64 pixels when two-dimensional orthogonal transformation processing using a Haar function is performed. FIGS. 15B–E respectively illustrate the higher-order coefficients or components for each of the four regions A–D. The power ratio (or absolute value ratio) calculation circuit 34 and data selector 34' provide a weighted signal for each region A–D. More specifically, the coefficient signal S12 from the two-dimensional orthogonal transformation circuit 11 (FIG. 3) is supplied to the sequence change memory 120 (FIG. 14) which is adapted to change the transfer sequence of the coefficients. That is, the sequence change memory 120 supplies therefrom a coefficient signal S12' wherein the coefficients are rearranged such that the 3 lower-order side coefficients and then the higher-order side coefficients are successively supplied therefrom 15 coefficients by 15 coefficients for each region A–D of FIG. 15A.

The coefficient signal S12' is supplied to the square value (or absolute value) calculation circuit 100, whereupon the calculation and the addition of the square value (or absolute value) are performed in the manner substantially similar to that of the circuit of FIG. 12. However, the resetting of the cumulative addition by the AND circuit 103 is performed for each set of the 3 lower-order side coefficients and each set of the higher-order side coefficients of the 4 regions A–D. The cumulative sum of the square value (or absolute value) of the 3 lower-order side coefficients is stored in the register 104a, in a manner similar to that of the circuit of FIG. 12. However, the cumulative sum of the square value (or absolute value) of each set of the higher-order side coefficients of the 4 regions A–D is stored in sequence in the register 104b.

The ratio calculation circuit 105 calculates, in sequence, the four ratios between the stored cumulative sum signal S104a of the square value (or absolute value) of the 3 lower-order coefficients supplied from the register 104a and the stored cumulative sum signal S104b of the square value (or absolute value) of each set of the higher-order side coefficients of the 4 regions A–D supplied from the register 104b so as to form the ratio signals S125. The calculated four ratio signals S125 are supplied in sequence to the classification circuit 106 which classifies such received signals and, as a result thereof, supplies four weighted signals S126 therefrom. Such weighted signals S126 are supplied to the registers 127a, 127b, 127c, and 127d which, in turn, respectively supply four weighted signals S34a, S34b, S34c, and S34d therefrom.

As shown in FIG. 3, the weighted signals S34a–34d from the power ratio (or absolute value ratio) calculation circuit 34 are supplied to the data selector circuit 34'. Such data selector circuit 34' is adapted to select one of the weighted signals S34a, S34b, S34c, and S34d for each pixel region A–D shown in FIG. 15 and to supply the same as a weighted signal S34', in synchronization with the delayed blocked image signal S11' and the blocked image signal S15, to the weighted sum calculation circuit 26. Based on the weighted signal S34', the weighted sum calculation circuit 26 calculates a weighted sum of the unprocessed image signal S11' and the image signal S15, which had been processed as previously described so as to smooth the block distortion, so as to form a blocked image signal S36 which is supplied through the scanning signal circuit 17 so as to form the output image signal S37. As a result of such processing, in the blocked image signal S36, an otherwise easily observable step-shaped distortion on a boundary or boundaries of the coded block(s) is smoothed step by step.

Thus, in the block distortion smoothing processor apparatus 800, the values of the coefficients other than the dc coefficient and the three lower-order side coefficients are forcibly set to zero. A correction value is added to the values of the higher-order side coefficients in accordance with the values of the three lower-order side coefficients. Thereafter, two-dimensional inverse orthogonal transformation processing is performed using a Haar function in a unit of the correction block S11 to the entire image so as to generate the image signal S15 in which easily observable step-shaped distortions on the boundaries of the coded blocks have been smoothed. The image signal S15 and the unprocessed restored image signal S11', which may contain a block distortion, are weighted and combined in accordance with the weighted signal S34. As a result, the range of such processing can be expanded and the step-shaped distortions on the boundaries of the coded block can be smoothed step by step.

The above-described block distortion smoothing processor apparatus 800 is able to produce an image in which the step-shaped distortion on a boundary or boundaries of the coded block(s) has been smoothed for a relatively small area unit step by step. Further, by utilizing such apparatus, the application or processing range may be extended as compared with the block distortion smoothing processor apparatus 600 of FIG. 2.

Although the above embodiments of the present invention have been described in terms of hardware such as the present block distortion smoothing processor apparatus, the present invention is not so limited. For example, the processing of the present invention may be performed by the use of software and a general DSP so as to obtain the same effect or result.

Further, although in describing the present invention, a two-dimensional wavelet transformation and a two-dimensional wavelet inverse transformation of a 10-channel partition using a Haar function were utilized in performing a two-dimensional orthogonal transformation and a two-dimensional inverse orthogonal transformation, the present invention is not so limited. For example, transformations in which the number of channels is different than ten, such as a two-dimensional Haar transformation and a two-dimensional Haar inverse transformation of a 16-channel partition, may also be utilized.

Figure 18:
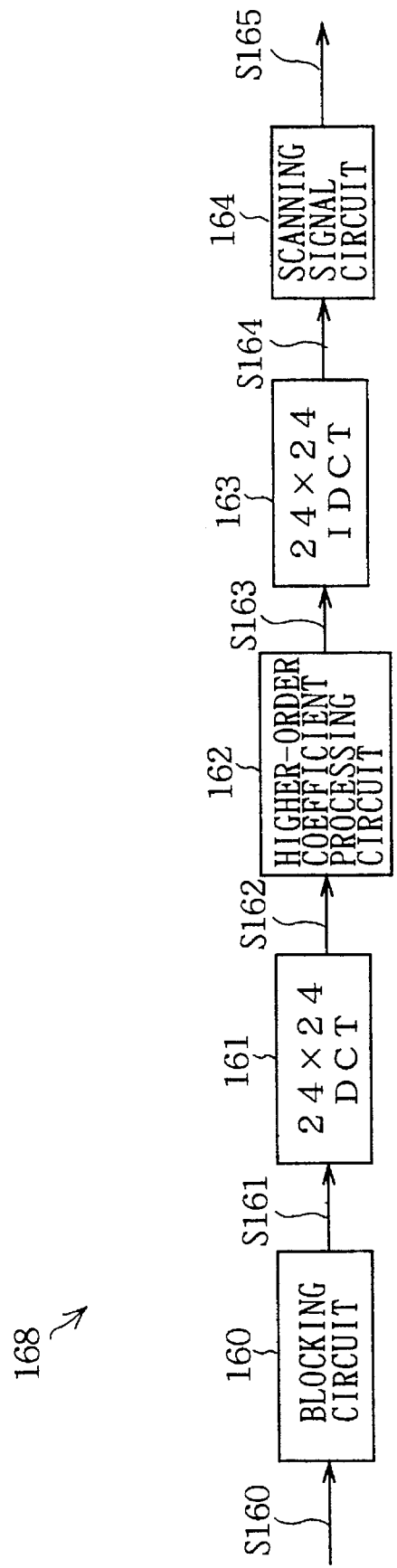
FIG. 18 is a block diagram of a block distortion smoothing apparatus according to the prior art.
Figure 19:
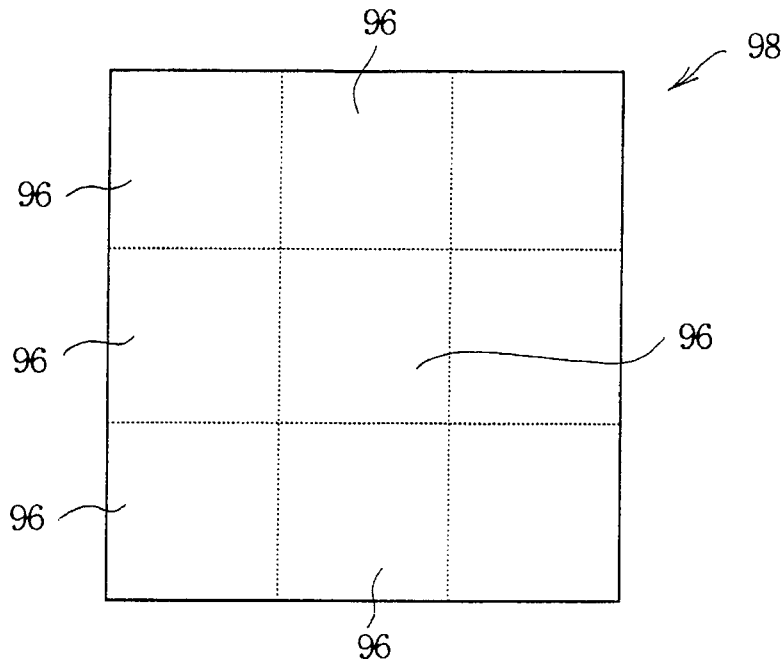
FIG. 19 is a diagram to which reference will be made in explaining the relationship between a coding block and a processing block.
Figure 20:
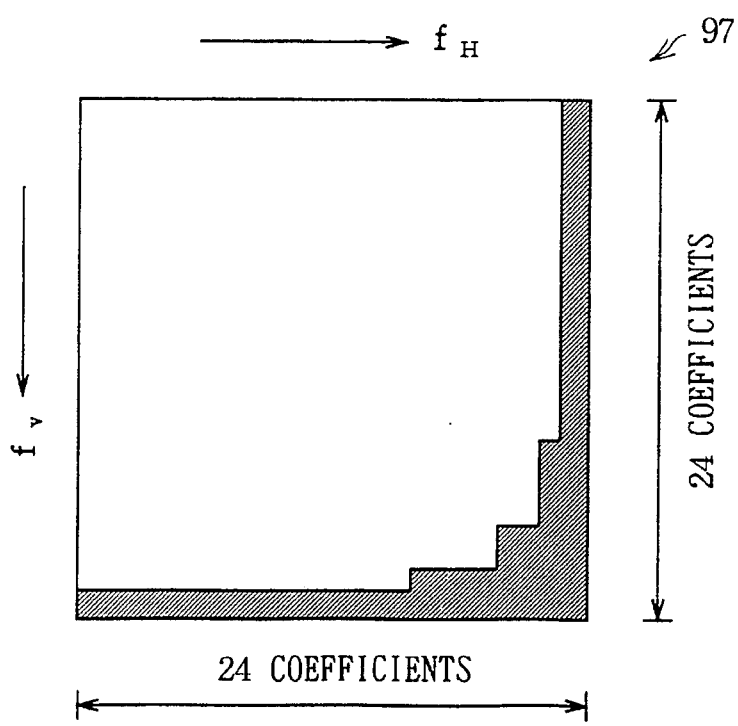
FIG. 20 is a diagram to which reference will be made in explaining the processing of higher-order coefficients.

Therefore, the above-described present block distortion smoothing processor apparatus eliminates a block-shaped distortion, which may be contained in a restored image signal obtained by decoding a coded image signal by using a two-dimensional inverse orthogonal transformation which had been coded by using a two-dimensional orthogonal transformation and transmitted or recorded and reproduced, by utilizing a block as a processing unit having a number of pixels which is substantially less than that of the conventional apparatus, such as that illustrated in FIG. 18. (For example, the block of the present apparatus may utilize ⅑ the number of pixels as compared to the conventional apparatus of FIG. 18). Further, by utilizing orthogonal transformation using a Haar function (in place of the conventional DCT), the amount of calculations are relatively small and, as a result, the size of the processing apparatus can be made relatively small. Such apparatus may be relatively easily applied to those situations having a dynamic image which are otherwise difficult for use with the conventional apparatus. Furthermore, for similar reasons, when the present technique is applied to a still image process using a general DSP, the amount of calculations for such processing is significantly reduced as compared to a conventional technique so that the processing speed can be significantly increased, whereupon the operation and/or handling of the associated apparatus becomes easier.

Further, in the above-described present block distortion smoothing processor apparatus, since an adaptable control which performs processing as needed or adjusts the strength of processing may be easily obtained, an otherwise easily observable block-shaped distortion can be eliminated and the subjective picture quality can be enhanced, while preventing disadvantageous effects such as the deterioration in the resolution caused by the processing. In addition, since adaptable control may be easily performed at a unit of area smaller than a processing block size, even if the present technique is applied to an image in which a fine portion and a flat portion are combined in a complicated manner, an otherwise easily observable block-shaped distortion of a flat portion may be eliminated and the subjective picture quality may be enhanced, while preventing disadvantageous effects such as the deterioration in the resolution of the fine positioning caused by processing.

Furthermore, by utilizing the above-described present block distortion smoothing processor apparatus or technique, the block-shaped distortion occurring due to the inappropriate or incorrect control of quantization is eliminated so that a quantization control circuit of a coding apparatus (which in the prior art is relatively complicated to fabricate and/or use) for obtaining a relatively high picture quality may be simplified and the size of such coding apparatus may be reduced while maintaining the picture quality. In addition, by utilizing the present technique, the amount of information needed to be transmitted to attain the same picture quality as compared to that obtained by using a conventional technique (such as that described herein) may be reduced. Similarly, the effective utilization of a medium having a limited storage capacity may be improved as compared to the prior art. For example, the recording time of a disk (whose capacity is limited) may be increased.

Although preferred embodiments of the present invention and modifications thereof have been described in detail herein, it is to be understood that this invention is not limited to these precise embodiments and modifications, and that other modifications and variations may be affected therein by one skilled in the art without departing from the spirit and scope of the invention as defined by the appended claims.

What is claimed is:

1. A method for processing a restored image signal having distortions obtained by decoding coded data by utilizing a two-dimensional inverse orthogonal transformation, said coded data obtained by coding an image signal by utilizing a two-dimensional orthogonal transformation, said method comprising the steps of:

constructing a correction block having pixels of four coded blocks which are adjacent to one another and having a distortion;

performing two-dimensional orthogonal transformation in units of said correction block by utilizing a Haar function so as to form a plurality of coefficients including higher-order side coefficients, three lower-order side coefficients and a dc coefficient;

calculating a ratio of one of a power sum and absolute value sum of said three lower-order side coefficients to a corresponding one of a power sum and absolute value sum of the coefficients other than said dc coefficient and said three lower-order side coefficients;

adding a correction value to said higher-order side coefficients in accordance with said three lower-order side coefficients after the coefficients other than said dc coefficient and said three lower-order side coefficients have been made zero so as to form a correction coefficient signal;

performing two-dimensional inverse orthogonal transformation on said correction coefficient signal in units of said correction block by utilizing the Haar function so as to generate a smoothed image signal in which step-shaped distortions on the boundaries of said coded blocks have been smoothed; and combining together said restored image signal and said smoothed image signal in accordance with said ratio so as to obtain an image signal in which the distortions on the boundaries of the coded blocks have been substantially eliminated.

2. The image signal processing method as in claim 1, wherein an image corresponding to the correction block is partitioned into four regions for each image of each coded block, and wherein the step of calculating includes calculating said dc coefficient utilized for reconstructing the images of the four regions of the correction block, calculating the respective one of said power sum and absolute value sum of the coefficients other than said dc coefficient and said three lower-order side coefficients for each region, and calculating a ratio of such calculation result and the respective one of said power sum and absolute value sum of the three lower-order side coefficients, and wherein said restored image signal and said smoothed image signal are combined together for each said region in accordance with said ratio so as to obtain said image signal.

3. A method for processing a decoded image signal having a distortion obtained by decoding coded data by utilizing a two-dimensional inverse orthogonal transformation, said coded data obtained by coding an image signal by utilizing a two-dimensional orthogonal transformation, said method comprising the steps of:

constructing at least one correction block each including a plurality of pixels from a plurality of coded blocks from said decoded image signal and having a distortion on at least one boundary therebetween, said coded blocks of each said correction block being adjacent to one another;

performing two-dimensional orthogonal transformation of each said correction block by utilizing a Haar function so as to form a plurality of coefficients including higher-order side coefficients, lower-order side coefficients and a dc coefficient;

calculating a ratio of one of a power sum and absolute value sum of a predetermined number of said lower-order side coefficients to a corresponding one of a power sum and absolute value sum of said higher-order side coefficients;

adding a correction value to said higher-order side coefficients in accordance with said predetermined number of said lower-order side coefficients after said higher-order side coefficients have been set to zero so as to form a correction coefficient signal for each said correction block;

performing two-dimensional inverse orthogonal transformation on the correction coefficient signal of each said correction block by utilizing the Haar function so as to generate a smoothed image signal in which said distortion on said at least one boundary of said coded blocks has been smoothed; and combining said decoded image signal and said smoothed image signal in accordance with said ratio so as to obtain an image signal in which said distortion on said at least one boundary of the coded blocks has been substantially eliminated.

4. A method for processing a decoded image signal according to claim 3, wherein each said correction block includes four coded blocks.

5. A method for processing a decoded image signal according to claim 4, wherein the predetermined number of said lower-order side coefficients is three.

6. An apparatus for processing a decoded image signal having a distortion obtained by decoding coded data by utilizing a two-dimensional inverse orthogonal transformation, said coded data obtained by coding an image signal by utilizing a two-dimensional orthogonal transformation, said apparatus comprising:

means for constructing at least one correction block each including a plurality of pixels from a plurality of coded blocks from said decoded image signal and having a distortion on at least one boundary therebetween, said coded blocks of each said correction block being adjacent to one another;

means for performing two-dimensional orthogonal transformation of each said correction block by utilizing a Haar function so as to form a plurality of coefficients including higher-order side coefficients, lower-order side coefficients and a dc coefficient;

means for calculating a ratio of one of a power sum and absolute value sum of a predetermined number of said lower-order side coefficients to a corresponding one of a power sum and absolute value sum of said higher-order side coefficients;

means for setting said higher-order side coefficients to zero and for determining respective correction values in accordance with said predetermined number of said lower-order side coefficients and for respectively adding said correction values to said higher-order side coefficients so as to form a correction coefficient signal for each said correction block;

means for performing two-dimensional inverse orthogonal transformation on the correction coefficient signal of each said correction block by utilizing the Haar function so as to generate a smoothed image signal in which said distortion on said at least one boundary of said coded blocks has been smoothed; and means for combining said decoded image signal and said smoothed image signal in accordance with said ratio so as to obtain an image signal in which said distortion on said at least one boundary of the coded blocks has been substantially eliminated.

7. An apparatus for processing a decoded image signal according to claim 6, wherein each said correction block includes four coded blocks.

8. An apparatus for processing a decoded image signal according to claim 7, wherein the predetermined number of said lower-order side coefficients is three.

* * * * *